(12) United States Patent
Fujie et al.

(10) Patent No.: US 8,011,774 B2
(45) Date of Patent: Sep. 6, 2011

(54) AZO DYE, COLORED COMPOSITION, HEAT-SENSITIVE TRANSFER RECORDING INK SHEET, HEAT-SENSITIVE TRANSFER RECORDING METHOD, COLOR TONER, INKJET INK AND COLOR FILTER

(75) Inventors: Yoshihiko Fujie, Minami-ashigara (JP); Hisashi Mikoshiba, Minami-ashigara (JP); Takuma Amemiya, Odawara (JP); Ryuji Shinohara, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 714 days.

(21) Appl. No.: 11/768,313

(22) Filed: Jun. 26, 2007

(65) Prior Publication Data

US 2008/0012930 A1    Jan. 17, 2008

(30) Foreign Application Priority Data

Jun. 30, 2006   (JP) .................. 2006-182440

(51) Int. Cl.
   *C09D 11/00*        (2006.01)
(52) U.S. Cl. ............... 347/100; 347/217; 106/31.51; 106/31.52
(58) Field of Classification Search .......... 347/100, 347/217; 106/31.5, 31.51, 31.52
   See application file for complete search history.

(56) References Cited

U.S. PATENT DOCUMENTS 4,885,272 A    12/1989   Chapman et al.
(Continued)

FOREIGN PATENT DOCUMENTS

DE           1234891 B     2/1967
(Continued)

OTHER PUBLICATIONS

Registry [CAS Registry Database], Registry No. 47532-15-0. Entry date Nov. 16, 1984.*

(Continued)

*Primary Examiner* — Matthew Luu
*Assistant Examiner* — Rut Patel
(74) *Attorney, Agent, or Firm* — Sughrue Mion, PLLC

(57) ABSTRACT

An azo dye represented by formula (1):

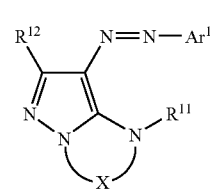

Formula (1)

wherein, $R^{11}$ represents a monovalent substituent, $R^{12}$ represents a hydrogen atom or a monovalent substituent, $Ar^1$ represents a specific heterocyclic group such as a group such as a group shown below, and X represents atoms necessary to form a ring;

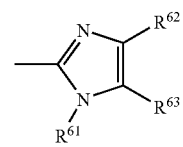

wherein, in the heterocyclic group, $R^{61}$ to $R^{63}$ each independently represents a hydrogen atom or a substituent.

20 Claims, 2 Drawing Sheets

U.S. PATENT DOCUMENTS

| | | | |
|---|---|---|---|
| 5,166,124 A * | 11/1992 | Weber | 503/227 |
| 5,403,811 A * | 4/1995 | Mikoshiba et al. | 503/227 |
| 6,458,194 B1 * | 10/2002 | Mikoshiba et al. | 106/31.5 |
| 2005/0139121 A1 * | 6/2005 | Fujiwara et al. | 106/31.5 |
| 2006/0068326 A1 * | 3/2006 | Mikoshiba et al. | 430/270.11 |
| 2006/0272544 A1 * | 12/2006 | Chino et al. | 106/31.27 |
| 2007/0202282 A1 * | 8/2007 | Fujie et al. | 428/32.39 |
| 2008/0081284 A1 * | 4/2008 | Watanabe et al. | 430/270.14 |
| 2008/0081766 A1 * | 4/2008 | Sakai et al. | 503/227 |

FOREIGN PATENT DOCUMENTS

| | | |
|---|---|---|
| EP | 0511626 A1 | 11/1992 |
| EP | 0733484 A2 | 9/1996 |
| EP | 0733486 A2 | 9/1996 |
| JP | 63-110452 | 5/1988 |
| JP | 2-24191 | 1/1990 |
| JP | 5-124364 | 5/1993 |
| JP | 2001-147510 | 5/2001 |

OTHER PUBLICATIONS

M. S. Chernov'Yants et al.: "Extraction-Photometric Determination of Antimony(V) with Azo Dyes of the Benimidazole Series" J. Analyt.Chem., vol. 51, No. 9, 1996, pp. 859-862, XP009091901, dye (VI) prior to quaternization.

UK Research Disclosure; vol. 121; p. 247 (May 1979).

* cited by examiner

AZO DYE, COLORED COMPOSITION, HEAT-SENSITIVE TRANSFER RECORDING INK SHEET, HEAT-SENSITIVE TRANSFER RECORDING METHOD, COLOR TONER, INKJET INK AND COLOR FILTER

FIELD OF THE INVENTION

The present invention relates to a particular novel azo dye and a colored composition including the azo dye, a heat-sensitive transfer recording ink sheet, a heat-sensitive transfer recording method, a color toner, an ink for inkjet, and a color filter, each of which contains the azo dye.

BACKGROUND OF THE INVENTION

In recent years, in particular, materials for forming a color image have been mainly used as an image recording material. Specifically, recording materials of inkjet system, recording materials of heat-sensitive transfer system, recording materials of electrophotographic system, silver halide photosensitive materials of transfer system, printing inks, recording pens, and the like, have been used extensively. Color filters are used in image pick-up elements, such as CCD for photographing equipment, and in displays, such as LCD and PDP, to record and reproduce color images.

In these color image recording materials and color filters, colorants (dyes or pigments) of three primary colors based on a so-called additive color mixing method or subtractive color mixing method are used, to reproduce (display) or record full-color images. A colorant, which has absorption characteristics that enable the acquisition of a preferred color reproduction range and has (color) fastness against various conditions for use is not available yet, and improvement is strongly desired.

As the heat-sensitive transfer recording method, there are a process including the steps of heating a heat-sensitive transfer material having a base film (support) and a hot-melt ink layer formed thereon with a thermal head, and recording the melted ink to an image-receiving material; and a process including the steps of heating a heat-sensitive transfer material having a base film and a dye-providing layer formed thereon that contains a heat transfer dye with a thermal head, and thermal diffusion transferring the dye to an image-receiving material. The latter heat-sensitive transfer process enables to change a transfer amount of the dye by altering energy applied to a thermal head, so that a gradation recording is easily achieved. Consequently, such the process is especially advantageous to a high quality full color recording. However, because the heat transfer dye used in the process is limited from various aspects, only a considerably few dye satisfies all the performances required for the process.

As the performances required for the process, there are, for example, spectral characteristics preferred in terms of color reproduction, easiness of transfer, light resistance and heat resistance, fastness to various chemicals, easiness of synthesis, and easiness of production of heat-sensitive transfer recording materials.

As the dye having both spectral characteristics preferred in terms of color reproduction and fastness to light and heat, the dyes disclosed in JP-A-1-225592 ("JP-A" means unexamined published Japanese patent application) and JP-A-63-189289 can be mentioned as examples. The transfer sensitivities of these dyes were sufficient for the heat-sensitive transfer recording at the time when such the inventions were disclosed in these publications, but were not sufficient for the current high-speed-transfer type heat-sensitive transfer recording. Accordingly, there is a demand for improvement in transfer sensitivity.

As the dyes that are excellent in transfer sensitivity, the dyes disclosed in JP-A-3-108583, JP-A-63-182193, JP-B-4-47635 ("JP-B" means examined Japanese patent publication) and JP-B-4-22714 can be mentioned as examples. However, as a result of promotion (speeding up) in a transfer speed according to a recent progress in technology, many dyes are not enough to fulfill the requirements for transfer sensitivity. Among these dyes, as the dyes that show excellent transfer sensitivity even in the high-speed-transfer type heat-sensitive transfer recording, the dyes disclosed in publication of JP-A-3-108583 can be mentioned as examples. However, these dyes are not satisfactory in terms of fastness to light and heat. Therefore, compatibility of high speed transferring property and fastness has been strongly desired.

On the other hand, a dye having a high solubility to a solvent enables not only reduction of a working load for dissolving a dye at the time when a heat-sensitive transfer ink sheet is prepared, but also preparation of a highly concentrated ink sheet solution. Consequently, such the dye is useful because a use amount of organic solvents can be saved, which results in reduction of load to environment. Therefore, it has been desired to develop a heat-sensitive transfer dye having a high solubility to a solvent.

Generally, toners containing a colorant dispersed in resin particles are widely used in color copiers and color laser printers of electrophotographic system. The properties required for the color toners include absorption characteristics that enable the acquisition of a preferred color reproduction range, high transmission (transparency) which becomes a problem in particular, when they are used in an over head projector (OHP); and (color) fastness against various factors under environmental conditions when using. Toners containing a pigment as a colorant dispersed in particles are disclosed in JP-A-62-157051, JP-A-62-255956 and JP-A-6-118715. Although these toners have excellent light resistance, they easily aggregate since they are insoluble in a solvent, thereby causing problems such as a reduction in transparency and a change in hue of transmitted color. On the other hand, toners containing a dye as a colorant are disclosed in JP-A-3-276161, JP-A-2-207274 and JP-A-2-207273. These toners have rather high transparency and have no change in hue but have a problem with light resistance.

Because of inexpensive material costs, capability of high-speed recording, reduced noise in recording operations, and ease in color recording, inkjet recording has rapidly come into wide use and is being further developed.

Inkjet recording methods include a continuous method in which droplets are supplied continuously and an on-demand method in which droplets are supplied in response to an image information signal. Ink discharge systems include: 1) one in which droplets are discharged by applying pressure with a piezoelectric element, 2) one in which droplets are discharged by producing air bubbles in ink with heat, 3) one using ultrasonic waves, and 4) one in which droplets are discharged by electrostatic suction. Aqueous ink, oil-based ink, and solid (fusible) ink are used as inkjet-recording ink.

The properties required for a colorant that is used in the inkjet-recording ink are: good solubility or dispersibility in a solvent; capability of high-density recording; good hue; fastness to light, heat, an active gas in environment (e.g. oxidative gases such as ozone, NOx, as well as SOx); excellent fastness to water and chemicals; good fixation and little blur on image-receiving materials; excellent storability as ink; being free from toxicity; high purity; and being available inexpensively.

However, it is very difficult to provide a colorant that satisfies these requirements on a high level. Particularly, it is desired that a colorant should have a good yellow hue, high solubility, and fastness to light, humidity and heat, and in particular, fastness to light is strongly desired.

Since a color filter needs to have high transparency, a method called a dyeing method, in which the color filter is colored with a dye, has been carried out. For instance, a photoresist which can be dyed is subjected to pattern exposure and development to form a pattern, and then the resulting pattern is dyed with a dye of filter color. Subsequently, these steps are repeated for all the colors of the filter, to produce a color filter. Besides the above dyeing method, a color filter can also be produced by a method using a positive-type resist. These methods provide a color filter which has high transmittance due to use of a dye, thereby being excellent in optical characteristics, but which has limitations, for example, to light resistance and heat resistance. Therefore, a dye which has excellent resistance to various factors and high transparency has been desired. Meanwhile, a method of using an organic pigment having excellent light resistance and heat resistance in place of a dye is widely known, but a color filter employing a pigment hardly gives optical properties equivalent to those employing a dye.

Dyes for use in the above various applications must have the following properties in common. That is, they must have, for example, a hue preferred from the viewpoint of color reproduction, an optimum spectral absorption, excellent fastness-properties such as light resistance, humidity resistance and chemical resistance, and a high solubility.

On the other hand, azo dyes having an azo bond at the 3-position of a pyrazole ring are disclosed in publications of JP-A-2005-162812 and JP-A-2003-41160, JP-A-2003-41161, JP-A-2003-41162, JP-A-2003-41163, JP-A-2003-128953, JP-A-2002-194258, and JP-A-8-231867, and azo dyes having a particular structure formed from a pyrazolotriazole coupling component are disclosed in publications of JP-A-63-110452 and JP-A-5-124364, JP-A-2001-147510, JP-A-2-24191, and UK Research Disclosure (1979), Vol. 181, page 247.

SUMMARY OF THE INVENTION

The present invention resides in an azo dye represented by formula (1):

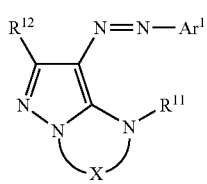

Formula (1)

wherein $R^{11}$ represents a monovalent substituent, $R^{12}$ represents a hydrogen atom or a monovalent substituent, $Ar^1$ represents a group selected from members (1) of heterocyclic groups set forth below, and X represents atoms necessary to form a ring;

Members (1) of Heterocyclic Groups

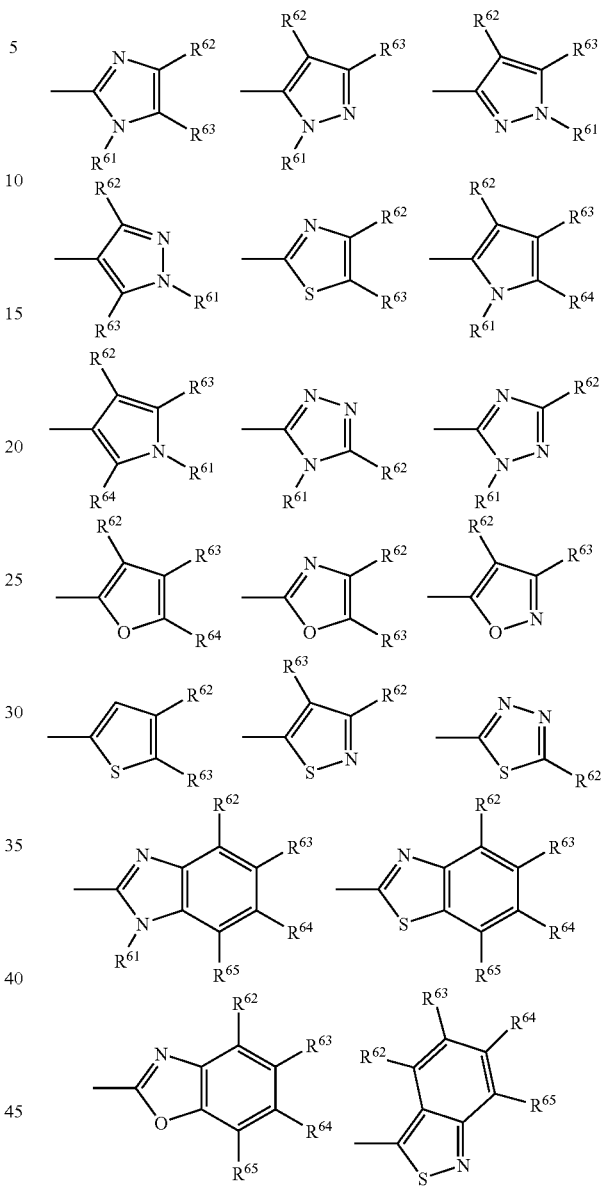

wherein, in members (1) of heterocyclic groups, $R^{61}$, $R^{62}$, $R^{63}$, $R^{64}$ and $R^{65}$ each independently represents a hydrogen atom or a substituent.

The present invention also resides in an colored composition, an ink sheet for heat-sensitive transfer recording, a heat-sensitive transfer recording method, a color toner, an inkjet ink, and a color filter, each using the aforementioned azo dye.

Other and further features and advantages of the invention will appear more fully from the following description, appropriately referring to the accompanying drawings.

DETAILED DESCRIPTION OF THE INVENTION

Figure 1:
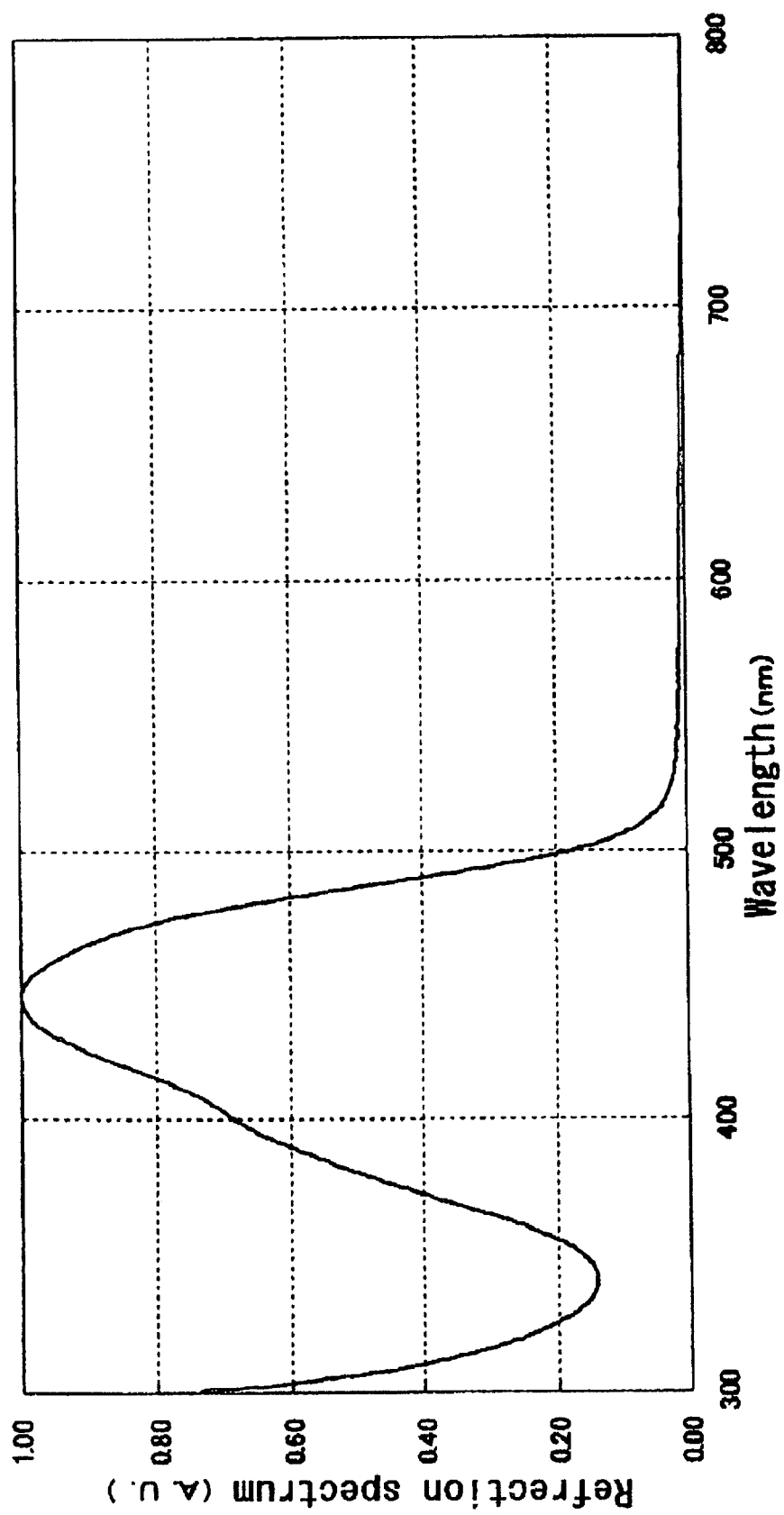
FIG. 1 shows a reflection spectrum of the image obtained by inkjet recording in a working example.

According to the present invention, there is provided the following means:

(1) An azo dye represented by formula (1):

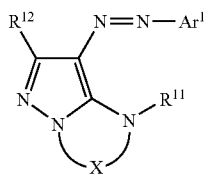

Formula (1)

wherein $R^{11}$ represents a monovalent substituent, $R^{12}$ represents a hydrogen atom or a monovalent substituent, $Ar^1$ represents a group selected from members (1) of heterocyclic groups set forth below, and X represents atoms necessary to form a ring;

Members (1) of Heterocyclic Groups

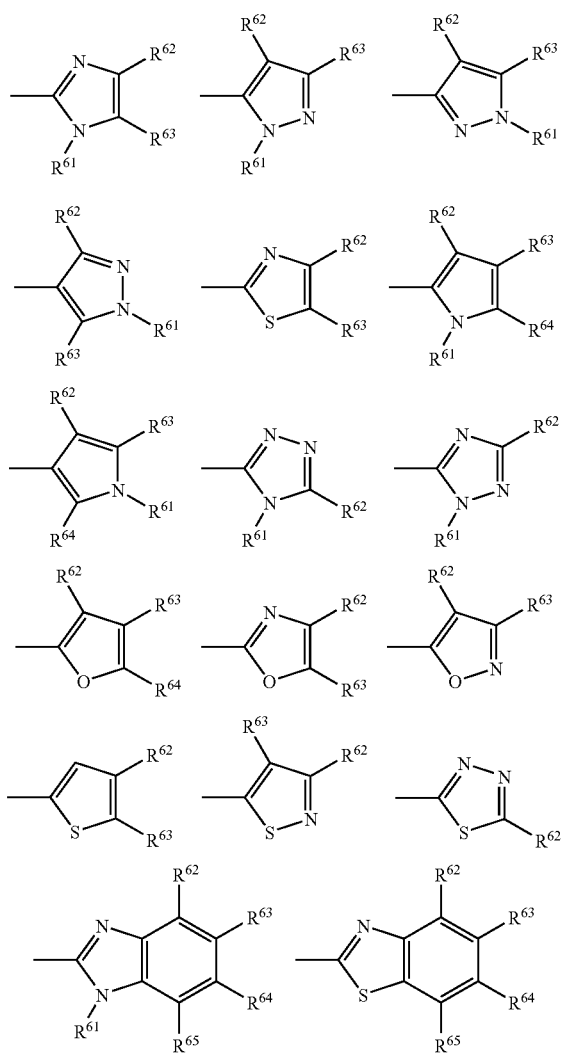

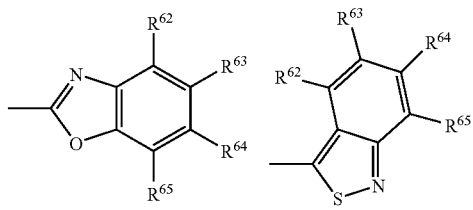

wherein, in members (1) of heterocyclic groups, $R^{61}$, $R^{62}$, $R^{63}$, $R^{64}$ and $R^{65}$ each independently represents a hydrogen atom or a substituent.

(2) The azo dye according to the above item (1), wherein $Ar^1$ in the formula (1) represents a group selected from members (2) of heterocyclic groups:

Members (2) of Heterocyclic Groups

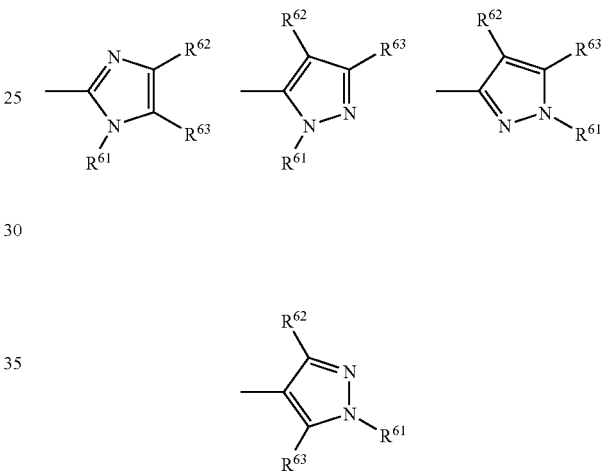

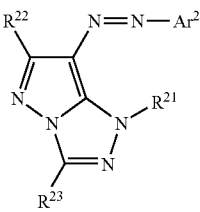

wherein $R^{61}$, $R^{62}$ and $R^{63}$ each independently represents a hydrogen atom or a substituent.

(3) The azo dye according to the above item (1), wherein X in the formula (1) represents $-C(R^{14})=N-$ or $-N=C(R^{14})-$, and $R^{14}$ represents a hydrogen atom or a substituent.

(4) The azo dye according to the above item (1), wherein the azo dye represented by formula (1) is an azo dye represented by formula (2) or (3):

Formula (2)

wherein, in formula (2), $R^{21}$ represents a monovalent substituent, $R^{22}$ and $R^{23}$ each independently represents a hydrogen atom or a monovalent substituent, $Ar^2$ represents a group selected from the members (1) of heterocyclic groups;

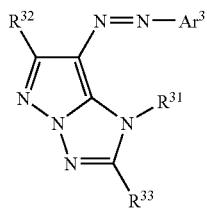

Formula (3)

wherein, in formula (3), $R^{31}$ represents a monovalent substituent, $R^{32}$ and $R^{33}$ represents a hydrogen atom or a monovalent substituent, $Ar^3$ represents a group selected from the members (1) of heterocyclic groups.

(5) The azo dye according to the above item (4), wherein $Ar^2$ and $Ar^3$ in the formula (2) or (3) each independently represents a group selected from members (2) of heterocyclic groups:

Members (2) of Heterocyclic Groups

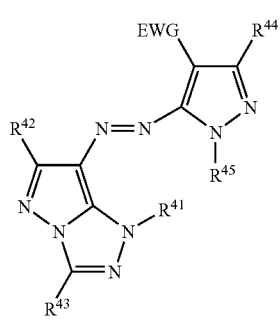

wherein, in members (2) of heterocyclic groups, $R^{61}$, $R^{62}$ and $R^{63}$ each independently represents a hydrogen atom or a substituent.

(6) The azo dye according to the above item (1), wherein the azo dye is an azo dye represented by formula (4) or (5):

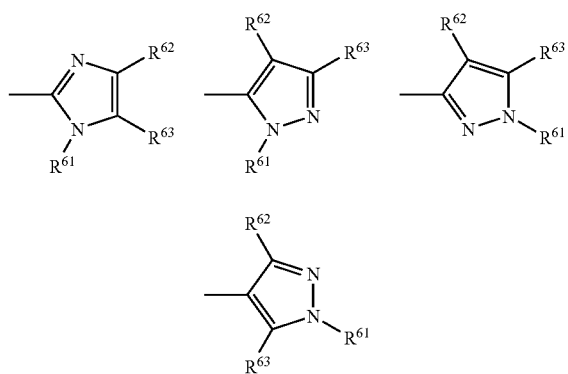

Formula (4)

wherein, in formula (4), $R^{41}$ and $R^{45}$ each independently represents a monovalent substituent, $R^{42}$, $R^{43}$ and $R^{44}$ each independently represents a hydrogen atom or a monovalent substituent, EWG represents an electron-withdrawing group having a Hammett's substituent constant $\sigma_p$ value of 0.2 to 1.0;

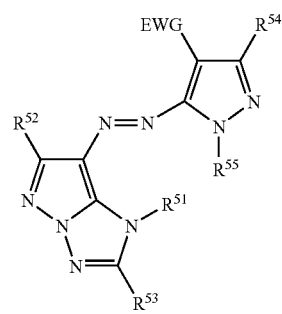

Formula (5)

wherein, in formula (5), $R^{51}$ and $R^{55}$ each independently represents a monovalent substituent, $R^{52}$, $R^{53}$ and $R^{54}$ each independently represents a hydrogen atom or a monovalent substituent, EWG represents an electron-withdrawing group having a Hammett's substituent constant $\sigma_p$ value of 0.2 to 1.0.

(7) The azo dye according to the above item (6), wherein the EWG in the formula (4) or (5) represents a carbamoyl group or a cyano group.

(8) A colored composition comprising the azo dye according to the above item (1).

(9) A heat-sensitive transfer recording ink sheet comprising the azo dye according to the above item (1).

(10) The heat-sensitive transfer recording ink sheet according to the above item (9) that comprises a dye-providing layer, wherein a content of the azo dye in the dye-providing layer is in the range of from 0.03 to 1.0 g/m².

(11) The heat-sensitive transfer recording ink sheet according to the above item (9) that comprises a thermally diffusible cyan dye which can form a cyan image, a thermally diffusible magenta dye which can form a magenta image, and a thermally diffusible yellow dye which can form a yellow image be formed.

(12) A heat-sensitive transfer recording method that comprises forming an image on an image-receiving receiving material having a support and an ink receptive layer containing a polymer on the support, using the heat-sensitive transfer recording ink sheet according to the above item (9).

(13) A color toner comprising the azo dye according to the above item (1).

(14) The color toner according to the above item (13) that comprises a carrier, wherein average particle diameter of the carrier is 30 to 150 μm in terms of volume average particle diameter.

(15) An ink for inkjet comprising the azo dye according to the above item (1).

(16) The ink according to the above item (15) that a pH is 6 to 10.

(17) A color filter comprising the azo dye according to the above item (1).

(18) The color filter according to the above item (17) that is a color filter of RGB primary colors or Y.M.C. complementary colors.

Hereinafter, an azo dye, and a colored composition including the azo dye, a heat-sensitive transfer recording ink sheet, a color toner, an inkjet ink and a color filter, each of which contains the azo dye of the present invention will be explained in detail. The constitutional requirements described below may be embodied on the basis of the representative embodiments of the present invention. However the present invention is not limited to such embodiments. In the present specification, "to" denotes a range including numerical values described before and after it as a minimum value and a maximum value.

First, there are explained in detail the azo dye represented by the above-described formula in any one of (1) to (5) according to the present invention.

The azo dye represented by the above-described formula (1) is a dye wherein $R^{11}$ is a monovalent substituent. The dye characterized by the said $R^{11}$ is excellent in light fastness and ozone fastness, as compared to the corresponding dye wherein $R^{11}$ is a hydrogen atom. The reason why such the advantage would be obtained is supposed that introduction of the monovalent substituent into the $R^{11}$ prevents the azo dye from forming a hydrazo form that is of inferior quality in light resistance and ozone resistance, as described in "kinosei sikiso (Functional Dyes)" co-authored by Shin Okawara, Ken Matsuoka, Koryo Hirashima, and Teijiro Kitao, Kodansya Scientific, pages 18 to 21 (1992), and "Shikizai (Color Materials)", Vol. 64, [1], pages 29 to 33 (1991).

As the dye having this feature, there are known from the past the dyes described in the publications such as JP-A-2-24191. However, these dyes that are not enough in solubility property cause such a problem as deposition with time in a heat-sensitive transfer ink sheet. Consequently, such a problem arises that the insufficient solubility makes it difficult that these dyes are used for the heat-sensitive transfer ink sheet.

In contrast, the azo dyes represented by any one of formulae (1) to (5) (particularly azo dyes represented by formula (4) or (5)) according to the present invention are those characterized by specific diazo components in addition to the presence of the above-described monovalent substituent. These azo dyes provide a high solubility property, thereby being prevented from the deposition with time in a heat-sensitive transfer ink sheet. Consequently, the problem of the deposition with time has been solved. In addition, these azo dyes exhibit excellent fastness to light. Further, these azo dyes having such particular structures were never known in the past. Because these dyes are excellent in solubility property, light resistance and ozone resistance, they are suitable for use of the heat-sensitive transfer ink sheet. In addition, it is expected that they could be suitably used for other applications such as an ink solution.

In formula (1), $R^{11}$ represents a monovalent substituent, $R^{12}$ represents a hydrogen atom or a monovalent substituent. There is no particular limitation on the substituent. Examples of the substituent include a halogen atom, an alkyl group (saturated aliphatic group including a cycloalkyl group and a bicycloalkyl group), an alkenyl group (unsaturated aliphatic group having a double bond including a cycloalkenyl group and a bicycloalkenyl group), an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group (including an alkylamino group, an anilino group and heterocyclic amino group), an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic-azo group, or an imido group. Each of these may further have a substituent(s).

Hereinafter, a monovalent substituent represented by $R^{11}$ and $R^{12}$ will be explained in more detail.

The halogen atom represented by $R^{11}$ and $R^{12}$ includes a fluorine atom, a chlorine atom, a bromine atom, and an iodine atom. Of these, a chlorine atom and a bromine atom are preferable, a chlorine atom is particularly preferable.

The alkyl group represented by $R^{11}$ and $R^{12}$ includes a cycloalkyl group and a bicycloalkyl group. The allyl group includes a substituted or unsubstituted, linear or branched alkyl group. The substituted or unsubstituted, linear or branched alkyl group is preferably an alkyl group having 1 to 30 carbon atoms. Examples of the alkyl group include a methyl group, an ethyl group, an n-propyl group, an isopropyl group, a t-butyl group, an n-octyl group, an eicosyl group, a 2-chloroethyl group, a 2-cyanoethyl group, or a 2-ethylhexyl group. The cycloalkyl group includes a substituted or unsubstituted cycloalkyl group. The substituted or unsubstituted cycloalkyl group is preferably a cycloalkyl group having 3 to 30 carbon atoms. Examples of the cycloalkyl group include a cyclohexyl group, a cyclopentyl group and a 4-n-dodecylcyclohexyl group. The bicycloalkyl group includes a substituted or unsubstituted bicycloalkyl group having 5 to 30 carbon atoms, i.e. a monovalent group obtained by removing one hydrogen atom from a bicycloalkane having 5 to 30 carbon atoms. Examples of the bicycloalkyl group include a bicyclo[1,2,2]heptan-2-yl group or a bicyclo[2,2,2]octan-3-yl group, and a tricyclo or higher structure having three or more ring structures. An alkyl group in a substituent described below (e.g. an alkyl group in an alkylthio group) represents such an alkyl group of the above concept.

The alkenyl group represented by $R^{11}$ and $R^{12}$ includes a cycloalkenyl group and a bicycloalkenyl group. The alkenyl group represents a substituted or unsubstituted linear, branched, or cyclic alkenyl group. The alkenyl group is preferably a substituted or unsubstituted alkenyl group having 2 to 30 carbon atoms. Examples of the alkenyl group include a vinyl group, an allyl group, a prenyl group, a geranyl group, or an oleyl group. The cycloalkenyl group is preferably a substituted or unsubstituted cycloalkenyl group having 3 to 30 carbon atoms, i.e. a monovalent group obtained by removing one hydrogen atom from a cycloalkene having 3 to 30 carbon atoms. Examples of the cycloalkenyl group include a 2-cyclopenten-1-yl group or a 2-cyclohexen-1-yl group. The bicycloalkenyl group includes a substituted or unsubstituted bicycloalkenyl group, and preferably a substituted or unsubstituted bicycloalkenyl group having 5 to 30 carbon atoms, i.e. a monovalent group obtained by removing one hydrogen atom from a bicycloalkene having one double bond. Examples of the bicycloalkenyl group include a bicyclo[2,2,1]hept-2-en-1-yl group or a bicyclo[2,2,2]oct-2-en-4-yl group.

The alkynyl group represented by $R^{11}$ and $R^{12}$ is preferably a substituted or unsubstituted alkynyl group having 2 to 30 carbon atoms, e.g. an ethynyl group, or a propargyl group.

The aryl group represented by $R^{11}$ and $R^{12}$ is preferably a substituted or unsubstituted aryl group having 6 to 30 carbon atoms, e.g. a phenyl group, a p-tolyl group, a naphthyl group, an m-chlorophenyl group, or an o-hexadecanoylaminophenyl group.

The heterocyclic group represented by $R^{11}$ and $R^{12}$ is a monovalent group obtained by removing one hydrogen atom from a substituted or unsubstituted aromatic or nonaromatic heterocyclic compound, which may be condensed to another ring. The heterocyclic group is preferably a 5- or 6-membered heterocyclic group, more preferably a 5- or 6-membered aromatic heterocyclic group having 3 to 30 carbon atoms. The hetero atom is preferably an oxygen atom, a sulfur atom, or a nitrogen atom. Examples of the heterocyclic group include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

The alkoxy group represented by $R^{11}$ and $R^{12}$ includes a substituted or unsubstituted alkoxy group. The alkoxy group is preferably a substituted or unsubstituted alkoxy group having 1 to 30 carbon atoms, e.g. a methoxy group, an ethoxy group, an isopropoxy group, an n-octyloxy group, a methoxyethoxy group, a hydroxyethoxy group, or a 3-carboxypropoxy group.

The aryloxy group represented by $R^{11}$ and $R^{12}$ is preferably a substituted or unsubstituted aryloxy group having 6 to 30 carbon atoms, e.g. a phenoxy group, a 2-methylphenoxy group, a 4-t-butylphenoxy group, a 3-nitrophenoxy group, or a 2-tetradecanoylaminophenoxy group.

The acyloxy group represented by $R^{11}$ and $R^{12}$ is preferably a formyloxy group, a substituted or unsubstituted alkylcarbonyloxy group having 2 to 30 carbon atoms, or a substituted or unsubstituted arylcarbonyloxy group having 6 to 30 carbon atoms, e.g. a formyloxy group, an acetyloxy group, a pivaloyloxy group, a stearoyloxy group, a benzoyloxy group, or a p-methoxyphenylcarbonyloxy group.

The carbamoyloxy group represented by $R^{11}$ and $R^{12}$ is preferably a substituted or unsubstituted carbamoyloxy group having 1 to 30 carbon atoms, e.g. an N,N-dimethylcarbamoyloxy group, an N,N-diethylcarbamoyloxy group, a morpholinocarbonyloxy group, an N,N-di-n-octylaminocarbonyloxy group, or an N-n-octylcarbamoyloxy group.

The alkoxycarbonyloxy group represented by $R^{11}$ and $R^{12}$ is preferably a substituted or unsubstituted alkoxycarbonyloxy group having 2 to 30 carbon atoms, e.g. a methoxycarbonyloxy group, an ethoxycarbonyloxy group, a t-butoxycarbonyloxy group, or an n-octylcarbonyloxy group.

The aryloxycarbonyloxy group represented by $R^{11}$ and $R^{12}$ is preferably a substituted or unsubstituted aryloxycarbonyloxy group having 7 to 30 carbon atoms, e.g. a phenoxycarbonyloxy group, a p-methoxyphenoxycarbonyloxy group, or a p-n-hexadecyloxyphenoxycarbonyloxy group.

The amino group represented by $R^{11}$ and $R^{12}$ includes an alkylamino group, an arylamino group, or a heterocyclicamino group. The amino group is preferably a substituted or unsubstituted alkylamino group having 1 to 30 carbon atoms, or a substituted or unsubstituted arylamino group having 6 to 30 carbon atoms, e.g. an amino group, a methylamino group, a dimethylamino group, an anilino group, an N-methylanilino group, a diphenylamino group, a hydroxyethylamino group, a carboxyethylamino group, a sulfoethylamino group, a 3,5-dicarboxyanilino group, or a 4-quinolylamino group.

The acylamino group represented by $R^{11}$ and $R^{12}$ is preferably a formylamino group, a substituted or unsubstituted alkylcarbonylamino group having 2 to 30 carbon atoms, or a substituted or unsubstituted arylcarbonylamino group having 6 to 30 carbon atoms, e.g. a formylamino group, an acetylamino group, a pivaloylamino group, a lauroylamino group, a benzoylamino group, or a 3,4,5-tri-n-octyloxyphenylcarbonylamino group.

The aminocarbonylamino group represented by $R^{11}$ and $R^{12}$ is preferably a substituted or unsubstituted aminocarbonylamino group having 1 to 30 carbon atoms, e.g. a carbamoylamino group, an N,N-dimethylaminocarbonylamino group, an N,N-diethylaminocarbonylamino group, or a morpholinocarbonylamino group. In the aminocarbonylamino group, the term "amino" has the same meaning as that described above amino group.

The alkoxycarbonylamino group represented by $R^{11}$ and $R^{12}$ is preferably a substituted or unsubstituted alkoxycarbonylamino group having 2 to 30 carbon atoms, e.g. a methoxycarbonylamino group, an ethoxycarbonylamino group, a t-butoxycarbonylamino group, an n-octadecyloxycarbonylamino group, or an N-methyl-methoxycarbonylamino group.

The aryloxycarbonylamino group represented by $R^{11}$ and $R^{12}$ is preferably a substituted or unsubstituted aryloxycarbonylamino group having 7 to 30 carbon atoms, e.g. a phenoxycarbonylamino group, a p-chlorophenoxycarbonylamino group, or an m-n-octyloxyphenoxycarbonylamino group.

The sulfamoylamino group represented by $R^{11}$ and $R^{12}$ is preferably a substituted or unsubstituted sulfamoylamino group having 0 to 30 carbon atoms, e.g. a sulfamoylamino group, an N,N-dimethylaminosulfonylamino group, or an N-n-octylaminosulfonylamino group.

The alkyl- or aryl-sulfonylamino group represented by $R^{11}$ and $R^{12}$ is preferably a substituted or unsubstituted alkylsulfonylamino group having 1 to 30 carbon atoms, or a substituted or unsubstituted arylsulfonylamino group having 6 to 30 carbon atoms, e.g. a methylsulfonylamino group, a butylsulfonylamino group, a phenylsulfonylamino group, a 2,3,5-trichlorophenylsulfonylamino group, or a p-methylphenylsulfonylamino group.

The alkylthio group represented by $R^{11}$ and $R^{12}$ is preferably a substituted or unsubstituted alkylthio group having 1 to 30 carbon atoms, e.g. a methylthio group, an ethylthio group, or an n-hexadecylthio group.

The sulfamoyl group represented by $R^{11}$ and $R^{12}$ is preferably a substituted or unsubstituted sulfamoyl group having 0 to 30 carbon atoms, e.g. an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, or an N—(N'-phenylcarbamoyl)sulfamoyl group.

The alkyl- or aryl-sulfinyl group represented by $R^{11}$ and $R^{12}$ is preferably a substituted or unsubstituted alkylsulfinyl group having 1 to 30 carbon atoms, or a substituted or unsubstituted arylsulfinyl group having 6 to 30 carbon atoms, e.g. a methylsulfinyl group, an ethylsulfinyl group, a phenylsulfinyl group, or a p-methylphenylsulfinyl group.

The alkyl- or aryl-sulfonyl group represented by $R^{11}$ and $R^{12}$ is preferably a substituted or unsubstituted alkylsulfonyl group having 1 to 30 carbon atoms, or a substituted or unsubstituted arylsulfonyl group having 6 to 30 carbon atoms, e.g. a methylsulfonyl group, an ethylsulfonyl group, a phenylsulfonyl group, or a p-toluenesulfonyl group.

The acyl group represented by $R^{11}$ and $R^{12}$ is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 4 to 30 carbon atoms and being bonded to said carbonyl group through a carbon atom, e.g. an acetyl group, a pivaloyl group, a 2-chloroacetyl group, a stearoyl group, a benzoyl group, a p-n-octyloxyphenylcarbonyl group, a 2-pyridylcarbonyl group, or a 2-furylcarbonyl group.

The alkoxycarbonyl group represented by $R^{11}$ and $R^{12}$ is preferably a substituted or unsubstituted alkoxycarbonyl group having 2 to 30 carbon atoms, e.g. a methoxycarbonyl group, an ethoxycarbonyl group, a t-butoxycarbonyl group, or an n-octadecyloxycarbonyl group.

The aryloxycarbonyl group represented by $R^{11}$ and $R^{12}$ is preferably a substituted or unsubstituted aryloxycarbonyl group having 7 to 30 carbon atoms, e.g. a phenoxycarbonyl group, an o-chlorophenoxycarbonyl group, an m-nitrophenoxycarbonyl group, or a p-tert-butylphenoxycarbonyl group.

The carbamoyl group represented by $R^{11}$ and $R^{12}$ is preferably a substituted or unsubstituted carbamoyl group having 1 to 30 carbon atoms, e.g. a carbamoyl group, an N-methylcarbamoyl group, an N,N-dimethylcarbamoyl group, an N,N-di-n-octylcarbamoyl group, or an N-(methylsulfonyl)carbamoyl group.

The aryl- or heterocyclic-azo group represented by $R^{11}$ and $R^{12}$ includes, for example, a phenylazo group, a 4-methoxyphenylazo group, 4-pivaloylaminophenylazo group, 2-hydroxy-4-propanoylphenylazo group.

The imido group represented by $R^{11}$ and $R^{12}$ includes, for example, an N-succinimido group or an N-phthalimido group.

In formula (1), X represents atoms necessary to form a ring. There is no particular limitation to the atoms necessary to form a ring. Typical examples of the atoms include those represented by —C($R^{13}$)=N—, —N=C($R^{13}$)—, —C(=O)—C($R^{13}$)=C($R^{14}$)— or —C(=O)—N($R^{13}$)—C(=O)—. $R^{13}$ and $R^{14}$ each independently represents a hydrogen atom or a substituent. Examples of the substituent are the same as described in $R^{11}$ and $R^{12}$.

In formula (1), $Ar^1$ represents a group selected from members (1) of the above-described heterocyclic groups. In each group selected from members (1) of the heterocyclic groups, $R^{61}$, $R^{62}$, $R^{63}$, $R^{64}$ and $R^{65}$ each independently represents a hydrogen atom or a substituent. Examples of the substituent are the same as described in $R^{11}$ and $R^{12}$.

$R^{11}$ is preferably a substituted or unsubstituted alkyl group having 1 to 4 carbon atoms, substituted or unsubstituted aryl group (having 6 to 10 carbon atoms, preferably), a substituted or unsubstituted heterocyclic group or a substituted or unsubstituted acyl group, more preferably an unsubstituted alkyl group having 1 to 4 carbon atoms.

$R^{12}$ is preferably a hydrogen atom, a substituted or unsubstituted alkyl group (having 1 to 4 carbon atoms, preferably), or a substituted or unsubstituted aryl group (having 6 to 10 carbon atoms, preferably), a substituted or unsubstituted heterocyclic group, a substituted or unsubstituted amino group, a substituted or unsubstituted alkoxy group or hydroxy group, more preferably a substituted or unsubstituted alkyl group (having 1 to 4 carbon atoms, preferably), or a substituted or unsubstituted aryl group (having 6 to 10 carbon atoms, preferably), further preferably a substituted or unsubstituted alkyl group (having 1 to 4 carbon atoms, preferably), particularly preferably a branched alkyl group (having 1 to 4 carbon atoms, preferably).

X is preferably —C($R^{14}$)=N— or —N=C($R^{14}$)—.

$Ar^1$ represents a group selected from members (2) of the above-described heterocyclic groups. In each group selected from members (2) of the heterocyclic groups, $R^{61}$, $R^{62}$ and $R^{63}$ each has the same meanings as $R^{61}$, $R^{62}$ and $R^{63}$ respectively in each group selected from members (1) of the heterocyclic groups. Examples of preferable substituents are also the same as described above.

In each group selected from members (1) or (2) of the heterocyclic groups, $R^{61}$ is preferably a hydrogen atom, a substituted or unsubstituted alkyl group, a substituted or unsubstituted aryl group, a substituted or unsubstituted heterocyclic group, more preferably a substituted or unsubstituted alkyl group or a substituted or unsubstituted aryl group. $R^{62}$, $R^{63}$, $R^{64}$ and $R^{65}$ each independently is preferably a hydrogen atom, a substituted or unsubstituted alkyl group, a substituted or unsubstituted alkenyl group, a substituted or unsubstituted aryl group, a substituted or unsubstituted heterocyclic group, a substituted or unsubstituted acyl group, a cyano group, a carbamoyl group or an alkoxycarbonyl group, more preferably a hydrogen atom, a substituted or unsubstituted alkyl group, substituted or unsubstituted aryl group, substituted or unsubstituted heterocyclic group or a cyano group.

The following is an explanation about a preferable combination of various substituents (atoms) that a dye represented by formula (1) may have: A preferred compound is a compound in which at least one of the substituents is the above-described preferable substituent. A more preferred compound is a compound in which many various substituents are the above-described preferable substituents. The most preferred compound is a compound in which all substituents are the above-described preferable substituents. Specific examples of preferable combinations include a combination in which $R^{11}$ stands for an unsubstituted alkyl group having 1 to 6 carbon atoms, $R^{12}$ stands for a substituted or unsubstituted alkyl group having 1 to 6 carbon atoms or a substituted or unsubstituted aryl group, X stands for —C($R^{14}$)=N— or —N=C($R^{14}$)—, $Ar^1$ stands for a group selected from members (1) of the above-described heterocyclic groups.

The dye represented by formula (1) is preferably an azo dye represented by formula (2) or (3). Herein, the azo dye represented by formula (2) or (3) is described in detail below.

$R^{21}$ and $R^{31}$ each have the same meaning as $R^{11}$, and preferable ranges thereof are also the same.

$R^{22}$ and $R^{32}$ each have the same meaning as $R^{12}$, and preferable ranges thereof are also the same.

$Ar^2$ and $Ar^3$ each have the same meaning as $Ar^1$, and preferable ranges thereof are also the same.

$R^{23}$ and $R^{33}$ each independently represents a hydrogen atom or monovalent substituent. Examples of the substituent are the same as described in $R^{11}$ and $R^{12}$. $R^{23}$ and $R^{33}$ is each independently preferably a hydrogen atom, a substituted or unsubstituted alkyl group, a substituted or unsubstituted alkenyl group, a substituted or unsubstituted aryl group, a substituted or unsubstituted heterocyclic group, an acyl group. $R^{23}$ and $R^{33}$ is more preferably a hydrogen atom, a substituted or unsubstituted alkyl group, a substituted or unsubstituted aryl group, a substituted or unsubstituted heterocyclic group.

The following is an explanation about a preferable combination of various substituents (atoms) that a dye represented by formula (2) may have: A preferred compound is a compound in which at least one of the substituents is the above-described preferable substituent. A more preferred compound is a compound in which many various substituents are the above-described preferable substituents. The most preferred compound is a compound in which all substituents are the above-described preferable substituents. The above-described preferable substituents are preferably one having 0 to 12 carbon atoms, and further preferably one having 1 to 10 carbon atoms. Specific examples of preferable combinations include a combination in which $R^{21}$ stands for an unsubstituted alkyl group having 1 to 6 carbon atoms, $R^{22}$ stands for a substituted or unsubstituted alkyl group having 1 to 6 carbon atoms or a substituted or unsubstituted aryl group (having 6 to 10 carbon atoms, preferably), $R^{23}$ stands for a substituted or unsubstituted alkyl group (having 1 to 6 carbon atoms, preferably) or a substituted or unsubstituted aryl group (having 6 to 10 carbon atoms, preferably) and $Ar^2$ stands for a group selected from members (2) of the above-described heterocyclic groups.

The following is an explanation about a preferable combination of various substituents (atoms) that a dye represented by formula (3) may have: A preferred compound is a compound in which at least one of the substituents is the above-described preferable substituent. A more preferred compound is a compound in which many various substituents are the above-described preferable substituents. The most preferred compound is a compound in which all substituents are the above-described preferable substituents. Specific examples of preferable combinations include a combination in which $R^{31}$ stands for an unsubstituted alkyl group having 1 to 6 carbon atoms, $R^{32}$ stands for a substituted or unsubstituted alkyl group having 1 to 6 carbon atoms or a substituted or unsubstituted aryl group, $R^{33}$ stands for a substituted or unsubstituted alkyl group or a substituted or unsubstituted aryl group and $Ar^3$ stands for a group selected from members (2) of the above-described heterocyclic groups.

The dye represented by formula (2) is preferably an azo dye represented by formula (4). The dye represented by formula (3) is preferably an azo dye represented by formula (5). Herein, the azo dye represented by formula (4) or (5) is described in detail below.

Herein, the Hammett's substituent constant $\sigma_p$ values are described.

The Hammett's rule is an empirical rule proposed by L. P. Hammett in 1935 to quantitatively describe the effect of a substituent on the reaction or equilibrium of a benzene derivative. Presently, the appropriateness of this rule is widely acknowledged. There are $\sigma_p$ and $\sigma_m$ as substituent constants obtained by the Hammett's rule. These values are described in many common books. For example, details of these values are described in "Lange's Handbook of Chemistry", edited by J. A. Dean, 12th edition, 1979 (McGraw-Hill), and "Extra issue of Kagakuno Ryoiki", No. 122, pp. 96-103, 1979 (Nankodo Publishing Co., Ltd.). In the present invention, substituents are defined and explained using Hammett's substituent constant $\sigma_p$. However, it must be noted that substituents are not necessarily limited to the substituents having Hammett's constants which are known and described in the literature. Therefore, needless to say, even if the Hammett's substituent constant is not described in the literature, the substituent whose Hammett's constant falls within the range when measured based on the Hammett's rule is included in the scope of the present invention. Further, although it must be noted that in the formulae used in the present invention any other compounds except benzene derivatives are included, as a scale for showing the electron effect of a substituent in interest, the $\sigma_p$ value is utilized regardless of its substituting position. In the present invention, the $\sigma_p$ value is used in the above meaning.

In formula (4) or (5), EWG represents an electron-withdrawing group having a Hammett's substituent constant $\sigma_p$ value of 0.2 to 1.0. EWG is preferably an electron-withdrawing group having the $\sigma_p$ value of 0.30 or more, more preferably 0.45 or more, and especially preferably 0.60 or more. The upper limit of the $\sigma_p$ value is preferably 1.0 or less. Examples of the electron-withdrawing group having the $\sigma_p$ value of 0.60 or more include a nitro group, a cyano group, a methane sulfonyl group, a trifluoromethane sulfonyl group, a trifluoroacetyl group, a dimethylaminosulfonyl group, and a sulfamoyl group. Examples of the electron-withdrawing group having the $\sigma_p$ value of 0.45 or more include an alkoxycarbonyl group, an acyl group, and a carboxyl group. Examples of the electron-withdrawing group having the $\sigma_p$, value of 0.30 or more include a sulfo group, and a carbamoyl group. More preferred are a cyano group, a carboxyl group, an alkoxycarbonyl group, and a carbamoyl group. Furthermore preferred are a cyano group, an alkoxycarbonyl group, and a carbamoyl group. Most preferred are a cyano group, and a carbamoyl group.

$R^{41}$ and $R^{51}$ each have the same meaning as $R^{21}$ and $R^{31}$, and preferable ranges thereof are also the same.

$R^{42}$ and $R^{52}$ each have the same meaning as $R^{22}$ and $R^{32}$, and preferable ranges thereof are also the same.

$R^{43}$ and $R^{53}$ each have the same meaning as $R^{23}$ and $R^{33}$, and preferable ranges thereof are also the same.

$R^{44}$ and $R^{54}$ each represent a hydrogen atom or monovalent substituent. Examples of the substituent are the same as described in $R^{11}$ and $R^{12}$. $R^{44}$ and $R^{54}$ each represents preferably a hydrogen atom, a substituted or unsubstituted alkyl group, a substituted or unsubstituted aryl group, a substituted or unsubstituted heterocyclic group, a substituted or unsubstituted amino group, a substituted or unsubstituted alkoxy group, a hydroxy group, more preferably a substituted or unsubstituted alkyl group, or a substituted or unsubstituted aryl group, further preferably a substituted or unsubstituted alkyl group, most preferably a branched alkyl group.

$R^{45}$ and $R^{55}$ each represent a monovalent substituent. Examples of the substituent are the same as described in $R^{11}$ and $R^{12}$. $R^{45}$ and $R^{55}$ each represents preferably a substituted or unsubstituted alkyl group having 1 to 4 carbon atoms, a substituted or unsubstituted aryl group, or a substituted or unsubstituted heterocyclic group, a substituted or unsubstituted acyl group, more preferably an unsubstituted alkyl group having 1 to 4 carbon atom.

The following is an explanation about a preferable combination of various substituents (atoms) that a dye represented by formula (4) may have: A preferred compound is a compound in which at least one of the substituents is the above-described preferable substituent. A more preferred compound is a compound in which many various substituents are the above-described preferable substituents. The most preferred compound is a compound in which all substituents are the above-described preferable substituents. Specific examples of preferable combinations include a combination in which EWG stands for a carbamoyl group or a cyano group, $R^{41}$ stands for an unsubstituted alkyl group having 1 to 6 carbon atoms, $R^{42}$ stands for a substituted or unsubstituted alkyl group having 1 to 6 carbon atoms, or a substituted or unsubstituted aryl group (having 6 to 10 carbon atoms, preferably), $R^{43}$ stands for a substituted or unsubstituted alkyl group (having 1 to 6 carbon atoms, preferably), or a substituted or unsubstituted aryl group (having 6 to 10 carbon atoms, preferably), $R^{44}$ stands for a substituted or unsubstituted alkyl group having 1 to 6 carbon atom or a substituted or unsubstituted aryl group (having 6 to 10 carbon atoms, preferably), and $R^{45}$ stands for an unsubstituted alkyl group having 1 to 6 carbon atom. Specific examples of more preferable combinations include a combination in which EWG stands for a cyano group, $R^{41}$ stands for an unsubstituted alkyl group having 1 to 6 carbon atoms, $R^{42}$ stands for a substituted or unsubstituted alkyl group having 1 to 6 carbon atoms, or a substituted or unsubstituted aryl group (having 6 to 10 carbon atoms, preferably), $R^{43}$ stands for a substituted or unsubstituted alkyl group (having 1 to 6 carbon atoms, preferably), or a substituted or unsubstituted aryl group (having 6 to 10 carbon atoms, preferably), $R^{44}$ stands for a substituted or unsubstituted alkyl group having 1 to 6 carbon atom or a substituted or unsubstituted aryl group (having 6 to 10 carbon atoms, preferably), and $R^{45}$ stands for an unsubstituted alkyl group having 1 to 6 carbon atom.

The following is an explanation about a preferable combination of various substituents (atoms) that a dye represented by formula (5) may have: A preferred compound is a compound in which at least one of the substituents is the above-described preferable substituent. A more preferred compound is a compound in which many various substituents are the above-described preferable substituents. The most preferred compound is a compound in which all substituents are the above-described preferable substituents. Specific examples of preferable combinations include a combination in which EWG stands for a carbamoyl group or a cyano group, $R^{51}$ stands for an unsubstituted alkyl group having 1 to 6 carbon atoms, $R^{52}$ stands for a substituted or unsubstituted alkyl group having 1 to 6 carbon atoms, or a substituted or unsubstituted aryl group, $R^{53}$ stands for a substituted or unsubstituted alkyl group, or a substituted or unsubstituted aryl group, $R^{54}$ stands for a substituted or unsubstituted alkyl group having 1 to 6 carbon atom or a substituted or unsubstituted aryl group and $R^{55}$ stands for an unsubstituted alkyl group having 1 to 6 carbon atom. Specific examples of more preferable combinations include a combination in which EWG stands for a cyano group, $R^{51}$ stands for an unsubstituted alkyl group having 1 to 6 carbon atoms, $R^{52}$ stands for a substituted or unsubstituted alkyl group having 1 to 6 carbon atoms, or a substituted or unsubstituted aryl group, $R^{53}$ stands for a substituted or unsubstituted alkyl group, or a substituted or unsubstituted aryl group, $R^{54}$ stands for a substituted or unsubstituted alkyl group having 1 to 6 carbon atom or a substituted or unsubstituted aryl group and $R^{55}$ stands for an unsubstituted alkyl group having 1 to 6 carbon atom.

A molecular weight of the dye represented by any one of the formulae (1) to (5) is preferably 500 or less, and more preferably 450 or less, from a viewpoint of thermal diffusion.

Hereinafter, specific examples of the azo dye represented by any one of the formulae (1) to (5) of the present invention will be shown, but the present invention is not limited thereto. In the following specific examples, "Ph" represents a phenyl group ($-C_6H_5$), "Et" represents a ethyl group ($-C_2H_5$).

(1)

(2)

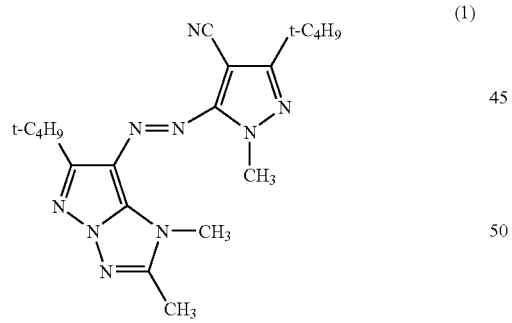

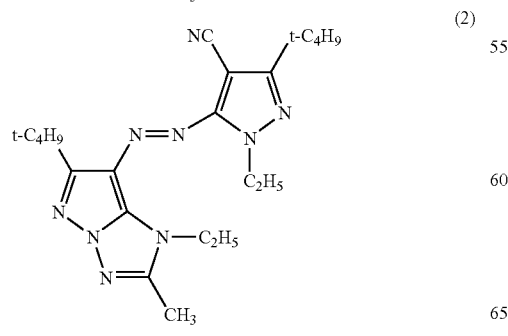

-continued (3)

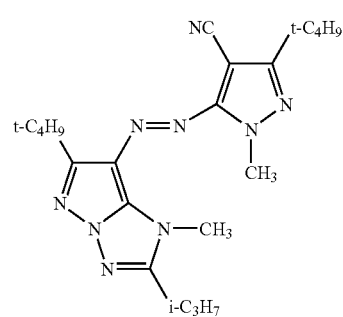

(4)

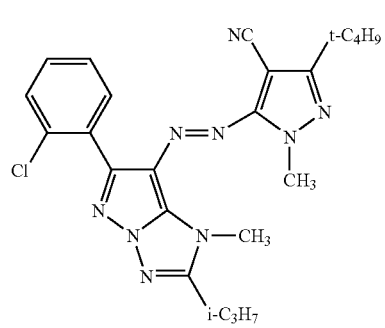

(5)

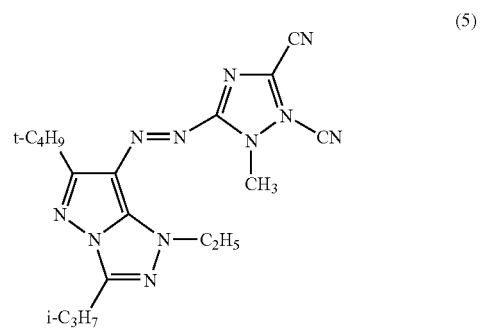

(6)

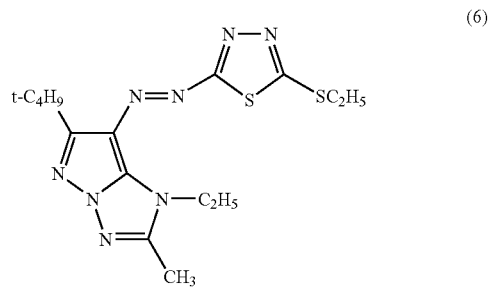

(7)

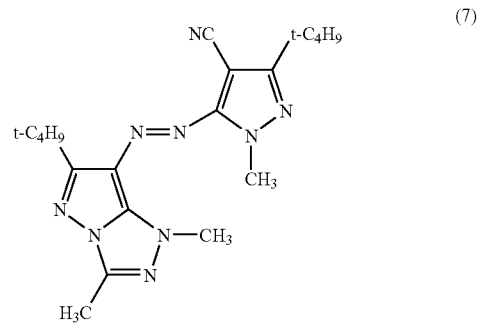

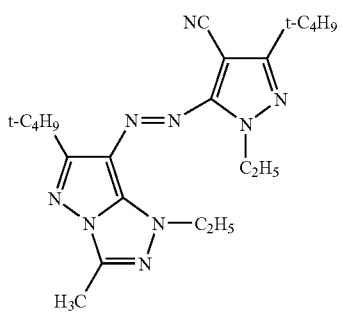
(8)
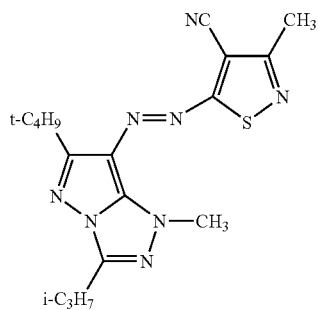
(13)
(9)
(14)
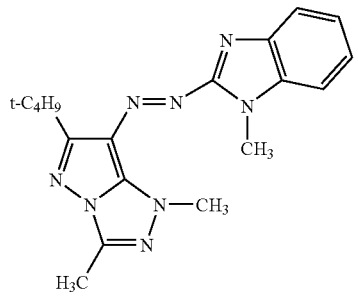
(10)
(15)
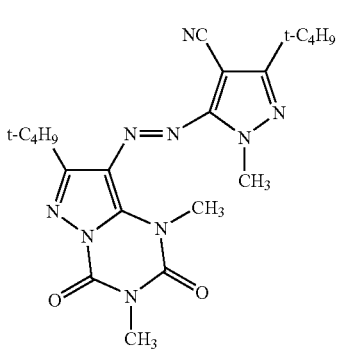
(11)
(16)
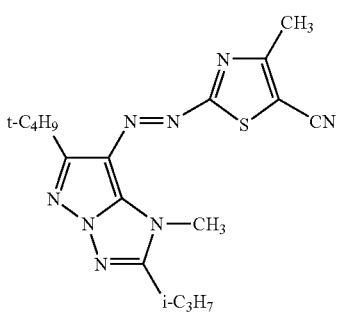
(12)
(17)
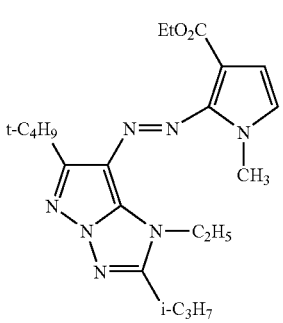

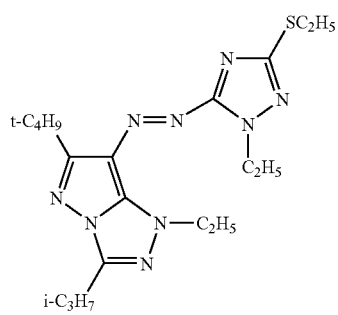
(18)
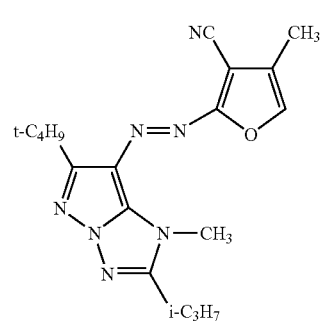
(19)
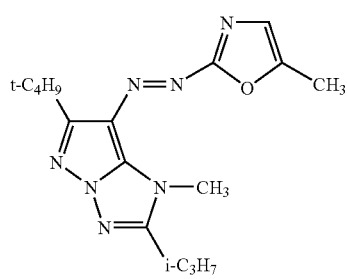
(20)
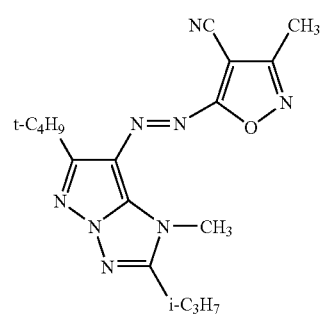
(21)
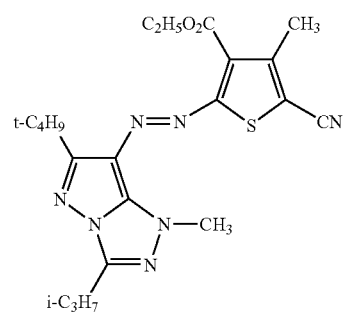
(22)
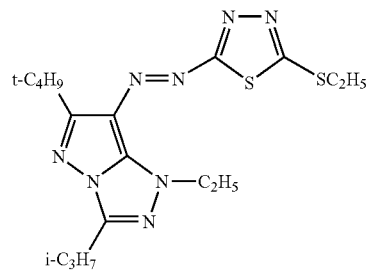
(23)
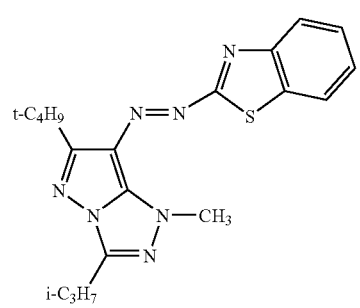
(24)
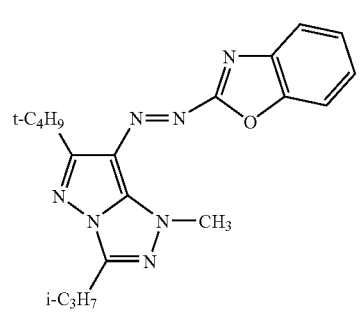
(25)
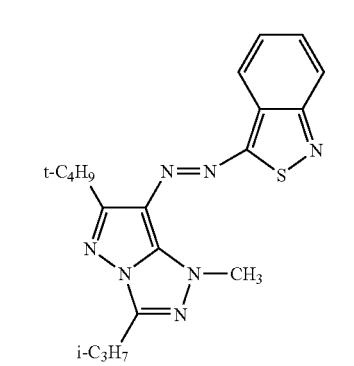
(26)
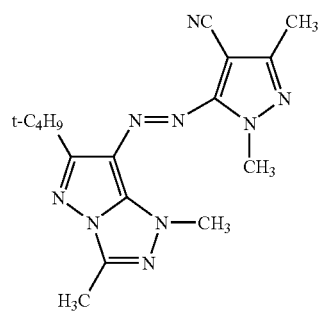
(27)

-continued

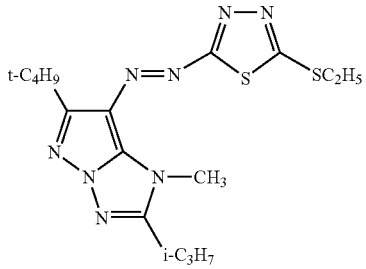
(28)

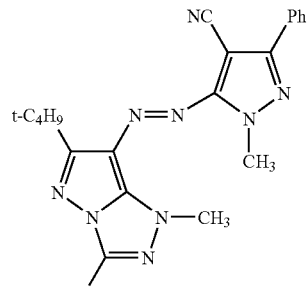
(29)

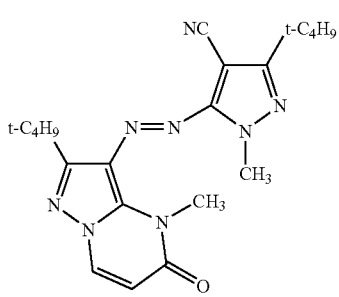
(30)

These compounds are easily synthesized by diazo-coupling a diazonium salt obtained from a heterocyclic amino group represented by $Ar^1$ with a condensed heterocyclic compound.

A maximum absorption wavelength of the azo dye of the present invention is preferably 400 to 480 mm, and more preferably 420 to 460 nm.

[Colored Composition]

The colored composition of the present invention can be preferably used in image-forming materials, such as heat-sensitive transfer recording ink sheets, color toners, and inkjet inks.

Herein, the term "colored composition" refers to a composition which is colored by use of the azo dye of the present invention, and the composition may further include another dye.

The colored composition may include any components as long as it includes the azo dye of the present invention. The colored composition is preferably in the form of being dissolved or dispersed in a solvent, or mixed or dispersed in a polymer or the like, or mixed as a powder with another substance.

Examples of components of the colored composition other than the above include a polymer, a latex polymer, an organic or inorganic solvent (e.g. methanol, water), a dye stabilizer, and an ultraviolet absorber.

Specific examples of the components include the substances explained in the explanation of each application described later.

In the present invention, it is preferable to use the colored composition in order to produce an image-forming material.

[Heat-Sensitive Transfer Recording Ink Sheet]

The heat-sensitive transfer recording ink sheet of the present invention is characterized in that the azo dye represented by any one of the above-described formulae (1) to (5) is contained in the ink sheet. The heat-sensitive transfer recording ink sheet generally has a structure composed of a support and a dye-providing layer formed on the support. The azo dye represented by any one of the formulae (1) to (5) is contained in the dye-providing layer. The heat-sensitive transfer recording ink sheet of the present invention can be manufactured by the steps of preparing an ink solution by dissolving the azo dye represented by any one of the formulae (1) to (5) in a solvent with a binder, or by dispersing fine grained azo dye, and forming a dye-providing layer by coating the ink solution on a support, followed by drying, if necessary.

As the support used for the heat-sensitive transfer recording ink sheet of the present invention, there can be optionally selected for use from conventional supports that have been used for an ink sheet support from the past. For example, there can be preferably used such materials as described in paragraph No. 0050 of JP-A-7-137466. Among these, modified cellulose-based resins and vinyl type resins are preferable; and propionic-acid-modified celluloses, a polyvinylbutyral, and a polyvinyl acetal are more preferable. A thickness of the support is preferably in the range of from 2 μm to 30 μm.

As a binder resin that can be used for the dye-providing layer in the heat-sensitive transfer recording ink sheet, there is no particular limitation of its kind, in so far as the binder has such a high-temperature resistance that the binder does not hinder transfer of the dye to an image-receiving layer. Examples of preferable binders include such materials as described in paragraph No. 0049 of JP-A-7-137466. Similarly, as a solvent for forming the dye-providing layer, there can be optionally selected for use from previously known solvents. Specifically, such a solvent as used in Example of JP-A-7-137466 can be preferably used.

A content of the azo dye represented by any one of the formulae (1) to (5) in the dye-providing layer is preferably in the range of from 0.03 g/m² to 1.0 g/m², more preferably from 0.1 g/m² to 0.6 g/m². A thickness of the dye-providing layer is preferably in the range of from 0.2 μm to 5 μm, more preferably from 0.4 μm to 2 μm.

The heat-sensitive transfer recording ink sheet of the present invention may have other layers than the dye-providing layer, in so far as the other layer does not excessively inhibit effects of the present invention. For example, there may be an interlayer between a support and the dye-providing layer, or a back layer on the surface of the support (hereinafter, such the surface is sometimes referred to as a back surface) opposite to the dye-providing layer in order to prevent the dye from diffusing forward to the support. Examples of the interlayer include a subbing layer and a diffusion-preventing layer (a hydrophilic barrier layer). Examples of the back layer include a heat resistant slip layer by which a thermal head can be prevented from adhesion to the ink sheet.

In order to use the above heat-sensitive recording material as a heat-sensitive recording material capable of recording a full-color image, it is preferred that a cyan ink sheet containing a thermally diffusible cyan dye which can form a cyan image, a magenta ink sheet containing a thermally diffusible magenta dye which can form a magenta image, and a yellow ink sheet containing a thermally diffusible yellow dye which can form a yellow image, are formed on a support (base) by applying sequentially. In addition to the above ink sheets, an ink sheet containing a black-image-forming substance may be further formed as required.

As a cyan ink sheet containing a thermally diffusible cyan dye capable of forming a cyan image, there can be preferably used such ink sheets as described in, for example, JP-A-3-103477 and JP-A-3-150194.

As a magenta ink sheet containing a thermally diffusible magenta dye capable of forming a magenta image, there can be preferably used such ink sheets as described in, for example, JP-A-5-286268.

[Heat-Sensitive Transfer Recording]

When a heat-sensitive transfer recording is performed using the heat-sensitive transfer recording ink sheet of the present invention, a heating tool such as a thermal head is used in combination with an image-receiving sheet. Specifically, the image recording is achieved according to a process in which a thermal energy transferred from a thermal head in accordance with image recording signals is given to an ink sheet, and then a dye in the portion to which the thermal energy was given is transferred to an image-receiving sheet and fixed therein. As a composition and a usable material of the image-receiving sheet, such compositions and materials as described in paragraph Nos. 0056 to 00.74 of JP-A-7-137466 can be preferably used.

[Color Toner]

The color toner of the present invention means a color toner comprising the azo dye represented by any one of the formulae (1) to (5). Any kinds of binders which are commonly used, may be used as a color toner binder resin for introducing the dye of the present invention. Examples of the binder resin include styrene-based resins, acrylic-based resins, styrene/acrylic resins and polyester resins. Inorganic fine-particles and organic fine-particles may be externally added to the toner, for the purposes of improving fluidity and controlling charge properties. Silica fine-particles and titania fine-particles whose surfaces are treated, for example, with a coupling agent containing an alkyl group are preferably used. Preferably, these fine-particles have a number average primary particle diameter of 10 to 500 nm and are contained in the toner in an amount of 0.1 to 20 mass %.

Any releasing agents which have been conventionally used may be used in the present invention. Specific examples of the release agent include olefins, such as low-molecular-weight polypropylenes, low-molecular-weight polyethylenes, and ethylene/propylene copolymers; microcrystalline wax, carnauba wax, sazol wax, and paraffin wax. The releasing agent is preferably added to the toner in an amount of 1 to 5 mass %.

The charge-control agent may be added if necessary. It is preferable to use an achromatic charge control agent, from the viewpoint of color-forming property. Examples of the charge control agent include those having a quaternary ammonium salt structure or calyx allene structure.

The carrier to be used may be either an uncoated carrier composed of only magnetic material particles such as iron or ferrite, or a resin-coated carrier obtained by coating the surface of a magnetic material particle with a resin or the like. The average particle diameter of this carrier is preferably 30 to 150 μm in terms of volume average particle diameter.

The method of forming an image, in which the toner according to the present invention is used, is not particularly limited. Examples of the method include a method in which color images are repeatedly formed on a photosensitive material and then transferred, to form an image; and a method in which images formed on a photosensitive material are transferred to an intermediate transfer material and the like sequentially, and then a color image formed on the intermediate transfer material is transferred to an image-forming member such as paper, to form a color image.

(Ink for InkJet)

The ink for inkjet of the present invention means an ink comprising the azo dye represented by any one of the formulae (1) to (5). The ink of the present invention can be prepared by dissolving and/or dispersing the azo dye represented by any one of the formulae (1) to (5), in a lipophilic medium or aqueous medium as the medium. An aqueous medium is preferably used. Because the ink of the present invention contains the dye excellent weather resistance, it can be preferably used as an inkjet-recording ink. Other additives may be contained if necessary, within a range not impairing the effect of the present invention. Such other additives include, for example, known additives such as a drying inhibitor (wetting agent), a fade-inhibitor, an emulsion stabilizer, a permeation accelerator, an ultraviolet absorber, an antiseptic, a mildew-proofing agent, a pH adjuster, a surface-tension modifier, an antifoaming agent, a viscosity modifier, a dispersing agent, a dispersion stabilizer, a rust preventive, and a chelating agent. These additives are generally added to the dispersion after preparation of the dispersion of the dye, but these additives may also be added to an oil phase or water phase during the preparation.

The above drying inhibitor is preferably used to prevent an inkjet nozzle used in inkjet recording system from being clogged with the dried inkjet recording ink.

The above drying inhibitor is preferably a water-soluble organic solvent having a lower vapor pressure than water. Specific examples of the drying inhibitor include: polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of a polyhydric alcohol, such as ethylene glycol monomethyl (or ethyl)ether, diethylene glycol monomethyl (or ethyl)ether, and triethylene glycol monoethyl (or butyl) ether; heterocyclic compounds, such as 2-pyrrolidone, N-methyl-2-pyrrolidone, 1,3-dimethyl-2-imidazolidinone, and N-ethylmorpholine; sulfur-containing compounds, such as sulfolane, dimethyl sulfoxide, and 3-sulfolene; polyfunctional compounds, such as diacetone alcohol, and diethanolamine; and urea derivatives. Out of these, polyhydric alcohols such as glycerin and diethylene glycol are preferred. The above drying inhibitors may be used singly or in combination of two or more of these. The drying inhibitor is preferably contained in the ink in an amount of 10 to 50 mass %.

The above permeation accelerator is preferably used for the purpose of improving permeation of the inkjet ink into paper. As the above permeation accelerator, use can be made of an alcohol such as ethanol, isopropanol, butanol, di(tri)ethylene glycol monobutyl ether or 1,2-hexanediol, or a nonionic surfactant such as sodium laurylsulfate or sodium oleate. In general, the permeation accelerator exhibits a satisfactory effect when it is contained in the ink in an amount of 5 to 30 mass %. The permeation accelerator is preferably used within the range of an amount to be added that does not cause print through or bleeding (blurring) of printed ink or print.

The above ultraviolet absorber is used to improve the preservability of an image. Examples of the ultraviolet absorber that can be used include benzotriazole-based compounds disclosed in JP-A-58-185677, JP-A-61-190537, JP-A-2-782, JP-A-5-197075 and JP-A-9-34057, benzophenone-based compounds disclosed in JP-A-46-2784, JP-A-5-194483 and U.S. Pat. No. 3,214,463, cinnamic acid-based compounds disclosed in JP-B-48-30492, JP-B-56-21141 and JP-A-10-88106, triazine-based compounds disclosed in JP-A-4-298503, JP-A-8-53427, JP-A-8-239368, JP-A-10-182621 and JP-T-8-501291 ("JP-T" means searched and published International patent application), compounds disclosed in Research Disclosure No. 24239, and compounds which emit fluorescent light by absorbing ultraviolet radiation, namely so-called fluorescent brighteners typified by stilbene-based or benzoxazole-based compounds.

The above fade-inhibitor is used to improve the preservability of an image. As the above fade-inhibitor, use can be made of various kinds of organic or metal complex-based fade-inhibitors. Examples of organic fade-inhibitors include hydroquinones, alkoxyphenols, dialkoxyphenols, phenols, anilines, amines, indanes, chromans, alkoxyanilines, and heterocyclic compounds. Examples of such a metal complex include nickel complexes and zinc complexes. Specific examples of the fade-inhibitor that can be used include compounds disclosed in patents cited in paragraphs I to J of Chapter VII of Research Disclosure No. 17643, Research Disclosure No. 15162, left column in page 650 of Research Disclosure No. 18716, page 527 of Research Disclosure No. 36544, page 872 of Research Disclosure No. 307105, and Research Disclosure No. 15162; and compounds included in the formulas of typical compounds and compound examples disclosed in pages 127 to 137 of JP-A-62-215272.

Examples of the mildewproofing agent include sodium dihydroacetate, sodium benzoate, sodium pyridinethion-1-oxide, p-hydroxybenzoic acid ethyl ester, 1,2-benzisothiazolin-3-one, and salts thereof. The mildewproofing agent is preferably used in the ink in an amount of 0.02 to 1.00 mass %.

As the above pH adjuster, use can be made of the above neutralizer (organic base, inorganic alkali). The above pH adjuster is preferably added to ensure that the pH of the inkjet ink become preferably 6 to 10, more preferably 7 to 10, for the purpose of improving the shelf stability of the inkjet ink.

As the above surface-tension modifier, mention can be made of a nonionic, cationic or anionic surfactant. The surface tension of the inkjet ink of the present invention is preferably 20 to 60 mN/m, more preferably 25 to 45 mN/m. The viscosity of the inkjet ink of the present invention is preferably 30 mPa·s or less, more preferably 20 mPa·s or less.

Examples of the surfactant include: anionic surfactants such as fatty acid salts, alkyl sulfuric acid ester salts, alkyl benzene sulfonic acid salts, alkyl naphthalene sulfonic acid salts, dialkyl sulfosuccinic acid salts, alkyl phosphoric acid ester salts, naphthalene sulfonic acid formalin condensates, and polyoxyethylene alkyl sulfuric acid ester salts; and nonionic surfactants such as polyoxyethylene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymers. SURFYNOLS (trade name, manufactured by Air Products & Chemicals, Inc.) which is an acetylene-based polyoxyethyleneoxide surfactant can also be preferably used. An amine oxide-type amphoteric surfactant, such as N,N-dimethyl-N-alkylamine oxide, is also preferred. Further, surfactants enumerated in pages (37) to (38) of JP-A-59-157,636, and Research Disclosure No. 308119 (1989) may also be used.

As the above antifoaming agent, use can be made, if necessary, of a fluorine-containing or silicone-based compound, or a chelating agent typified by EDTA.

In order to disperse the compound represented by any one of the formulae (1) to (5) of the present invention in an aqueous medium, it is preferred that coloring fine-particles containing the dye represented by any one of the formulae (1) to (5) and an oil-soluble polymer be dispersed in an aqueous medium, as disclosed in JP-A-11-286637, JP-A-2001-240763, JP-A-2001-262039 and JP-A-2001-247788; or that the dye represented by any one of the formulae (1) to (5) of the present invention which is dissolved in a high-boiling organic solvent be dispersed in an aqueous medium, as disclosed in JP-A-2001-262018, JP-A-2001-240763, JP-A-2001-355734 and JP-A-2002-80772. As for the specific method of dispersing the dye represented by any one of the formulae (1) to (5) of the present invention in an aqueous medium, and the oil-soluble polymer, high-boiling organic solvent and additives to be used in the methods, and the amounts to be used thereof, those disclosed by the above patent publications are preferably adopted. Alternatively, the above bis azo compound in the solid state may be directly dispersed in the form of fine particles. At the time of dispersing, a dispersing agent or a surfactant may be used.

Examples of the dispersing apparatus that can be used include a simple stirrer or impeller, an in-line mixer, a mill (e.g., a colloid mill, a ball mill, a sand mill, an attritor, a roller mill, or an agitator mill), an ultrasonic disperser, and a high-pressure emulsifying disperser (high-pressure homogenizer: gorille homogenizer, micro-fluidizer, DeBEE 2000 (trade name, manufactured by BEE International Co., Ltd.), etc. as commercially available apparatuses). In addition to the above patent publications, the details of the methods of preparing the inkjet recording ink are described in JP-A-5-148436, JP-A-5-295312, JP-A-7-97541, JP-A-7-82515, JP-A-7-118584, JP-A-11-286637, and JP-A-2001-271003. These methods can also be utilized in the preparation of the inkjet-recording ink of the present invention.

The aqueous medium described above can be a mixture composed of water as a main component and a water-miscible organic solvent as an optional component. Examples of the water-miscible organic solvent include alcohols (e.g., methanol, ethanol, n-propanol, isopropanol, butanol, isobutanol, sec-butanol, t-butanol, pentanol, hexanol, cyclohexanol and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). These water-miscible organic solvents may be used in combination of two or more of these.

(Color Filter)

The color filter of the present invention means a color filter comprising the azo dye represented by any one of the formulae (1) to (5). As the method of forming a color filter, can be mentioned a method in which a pattern is formed with a photoresist, and then dyed; and a method in which a pattern is formed with a photoresist containing a dye, as disclosed in JP-A-4-163552, JP-A-4-128703 and JP-A-4-175753. To introduce the dye represented by any one of the formulae (1) to (5) of the present invention into a color filter, any one of the above methods may be used. Examples of preferred means includes, as disclosed in JP-A-4-175753 and JP-A-6-35182, a positive resist composition containing a thermosetting resin, a quinonediazido compound, a crosslinking agent, a colorant and a solvent; and a method of forming a color filter which comprises: applying the composition onto a base, subjecting the applied base exposure to light through a mask, subjecting the exposed portion to development, to form a positive resist pattern, exposing the entire positive resist pattern to light, and curing the exposed positive resist pattern. Further, a color filter of RGB primary colors or Y. M. C. complementary colors can be obtained, by forming a black matrix in accordance in a usual manner.

As for the thermosetting resin, quinonediazido compound, crosslinking agent and solvent to be used, and the amounts to be used thereof, those disclosed in the above patent publications can be preferably used.

According to the present invention, it is possible to provide a novel azo dye and a colored composition including the azo dye having excellent spectral characteristics in terms of sharp absorption, high fastness-properties and an excellent solubility to solvents; and also a heat-sensitive transfer recording ink sheet having excellent storage stability, a heat-sensitive transfer recording method, each of which contains the azo dye. Further, the present invention also provides a color toner, an inkjet ink and a color filter, each of which contains the azo dye. Therefore, the present invention is expected to be effectively used for a high quality full color recording, and the like. Consequently, a high applicability in the industry is expected.

The azo dyes and colored composition including the azo dye of the present invention have a hue preferred for color reproduction, and also they are excellent in fastness-properties such as light resistance, humidity resistance and chemical resistance, and also they have a high solubility, so that they can be preferably used for a color image-recording material and a color filter.

The heat-sensitive transfer recording ink sheet of the present invention not only has high transfer sensitivity, but also has both excellent spectral characteristics in terms of sharp absorption and high fastness-properties, both of which were believed in the past that their compatibility was difficult in the current high speed transfer type heat-sensitive transfer recording. Further, the ink sheet of the present invention has an excellent solubility to solvents, which enables to reduce a working load at the time of preparation of the ink sheet and a load to environment. The heat-sensitive transfer recording method using the said ink sheet satisfies all the requirements of excellent color reproduction of a print image, image preservability and transfer sensitivity.

The color toner containing the azo dye of the present invention has absorption characteristics by which an excellent color reproduction region can be achieved. The color toner of the present invention is also excellent in light resistance.

The inkjet ink containing the azo dye of the present invention has a good yellow hue, a high solubility and an excellent light resistance.

The color filter containing the azo dye of the present invention has a high transmittance and an excellent light resistance and heat resistance.

The present invention will be described in more detail based on the following examples, but the invention is not intended to be limited thereto.

EXAMPLES

The materials, use amounts, proportions, processing details and processing steps can be optionally changed, in so far as they do not deviate from the spirit of the present invention. Accordingly, the scope of the present invention should not be construed as being limited to the specific examples set forth below.

Example 1

Synthesis Example

Preparation of Exemplified Compound (7)

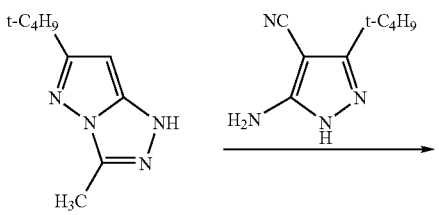

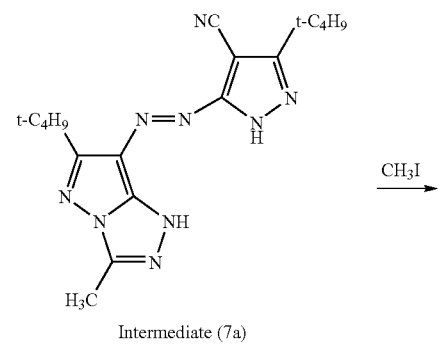

Intermediate (7a)

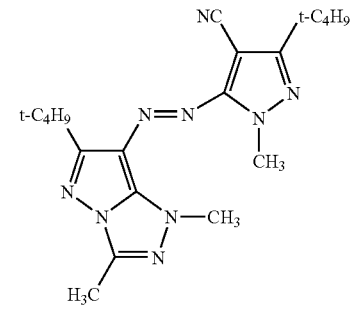

Exemplified compound (7)

<Preparation of Intermediate (7a)>

4.93 g (0.03 mol) of 3-amino-5-tert-butyl-2H-pyrazole-4-carbonitrile was dissolved in a mixture of acetic acid (6 ml), propionic acid (10 ml) and conc. hydrochloric acid (10 ml), and cooled down to 0° C. To the solution was dropped 2.07 g (0.03 mol) of sodium nitrite per 5 ml of water at an inner temperature of 5° C. or less, and then stirred for 15 minutes at an inner temperature ranging from 0° C. to 5° C., thereby to prepare a diazo solution. Separately, in 90 ml of acetonitrile was dispersed 5.34 g (0.03 mol) of 6-tert-butyl-3-methyl-1H-pyrazolo[5,1-c][1,2,4]triazole, and then cooled down to an inner temperature of 5° C. To the resultant dispersion was dropped the previously prepared diazo solution at an inner temperature of 5° C. or less. Thereafter, stirring for 1 hour at 5° C. and 30 minutes at room temperature, 100 ml of water was dropped thereto. After stirring for 1 hour on an ice bath, precipitated crystals were collected by filtration. Thus, a yellow powder of Intermediate (7a) was obtained in yield of 9.13 g (86%).

<Preparation of Exemplified Compound (7)>

A mixture of 3.53 g of Intermediate (7a) (0.01 mol), 2.76 g of potassium carbonate (0.02 mol) and dimethylacetamide (15 ml) was stirred at 0° C. To the mixture was gradually dropped 4.23 g (0.03 mol) of methyl iodide. After stirring for 3 hours at room temperature, 50 ml of water was added thereto. After extraction with 50 ml of ethyl acetate, the extracted solution was washed with saturated brine. Then, the extracted solution was concentrated with a rotary evaporator. Thus-obtained residue was purified using a silica gel chromatography (developing solvent: ethyl acetate/hexane=1/4, v/v). A yellow powder of Exemplified compound (7) was obtained. Yield: 3.01 g (82%), Melting Point: 192° C. λmax (ethyl acetate solution) of the Exemplified compound (7) was 442 nm.

Exemplified compounds (1), (5), (8), (9), (10), (13) and (23) were synthesized in the manner described above. In Table 1 shown below, are indicated the maximum absorption wavelength in each of absorption spectra of the thus-obtained Exemplified compounds (1), (5), (8), (9), (10), (13) and (23) in an ethyl acetate solution (Density: $1 \times 10^{-6}$ mol/L, Optical path length: 10 mm) and melting points of these compounds, together with the Exemplified compounds (7) obtained in the Synthesis Examples.

Further, it is supposed from a chemical point of view that other compounds than the above-exemplified compounds could be also synthesized according to the methods described in the foregoing Synthesis Examples.

TABLE 1

| Dye | Maximum absorption wavelength (nm) | Melting point (° C.) |
|---|---|---|
| (1) | 434 | 201-203 |
| (5) | 440 | 181-185 |
| (7) | 442 | 191-192 |
| (8) | 441 | 160-161 |
| (9) | 441 | 171-180 |
| (10) | 443 | 151-156 |
| (13) | 471 | 115-118 |
| (23) | 449 | 142-145 |

Example 2

Application Example 1

Production of Heat-Sensitive Transfer Recording Ink Sheet

As a support, was used a 6 μm thick polyester film, a back surface of which had been subjected to a heat resistant lubricating processing with a 1 μm thick thermosetting acrylic resin (Lumirror (trade name), a product of Toray). On the front surface of the support, the following dye-providing layer-coating composition was coated by a wire bar coating so that a dry thinness of the dye-providing layer became 1 μm. Thus, Ink sheet 1 was prepared.

| (Dye-providing layer-coating composition) | |
|---|---|
| Exemplified compound (1) | 5.5 parts by mass |
| Polyvinylbutyral resin (Trade name: ESLEC BX-1, manufactured by Sekisui Chemical Co., Ltd.) | 4.5 parts by mass |
| Methyl ethyl ketone/toluene (1/1, at mass ratio) | 90 parts by mass |

Ink sheets 2 to 9 and ink sheets for comparison 10 to 12 were produced in the same manner as in the production of the ink sheet 1, except that the above exemplified compound (1) was altered to the following dye as shown in Table 2, respectively. Solubility of these dyes contained in these ink sheets were evaluated according to the following three grades;
A: The dye easily dissolves.
B: The dye dissolves.
C: The dye is sparingly soluble, but dissolves.

Further, deposition of dyes with a lapse of time in the ink sheet was examined by a native eye, thereby to evaluate based on the following three grades:
A: No precipitation is observed.
B: Precipitation is slightly observed.
C: Precipitation is apparently observed.

The thus-obtained results are shown in Table 2.

Example 3

Application Example 2

A Heat-Sensitive Transfer Recording (Production of Image-Receiving Material)

Synthetic paper (trade name: Yupo FPG 200, manufactured by Yupo Corporation, thickness: 200 μm) was used as the support to apply a white intermediate layer and a receptor layer having the following compositions in this order to one surface of this support by a bar coater. The application was carried out such that the amount of the white intermediate layer and the amount of the receptor layer after each layer was dried were 1.0 g/m² and 4.0 g/m², and these layers were respectively dried at 110° C. for 30 seconds.

| White-intermediate-layer coating composition | |
|---|---|
| Polyester resin (Trade name: Vylon 200, manufactured by Toyobo Co., Ltd.) | 10 parts by mass |
| Fluorescent whitening agent (Trade name: Uvitex OB, manufactured by Ciba Specialty Chemicals) | 1 part by mass |
| Titanium oxide | 30 parts by mass |
| Methyl ethyl ketone/toluene (1/1, at mass ratio) | 90 parts by mass |
| Receptor-layer coating composition | |
| Vinyl chloride/vinyl acetate resin (Trade name: Solbin A, manufactured by Nisshin Chemicals Co., Ltd.) | 100 parts by mass |
| Amino-modified silicone (Trade name: X22-3050C, manufactured by Shin-Etsu Chemical Co., Ltd.) | 5 parts by mass |

| | |
|---|---|
| Epoxy-modified silicone (Trade name: X22-300E, manufactured by Shin-Etsu Chemical Co., Ltd.) | 5 parts by mass |
| Methyl ethyl ketone/toluene (=1/1, at mass ratio) | 400 parts by mass |
| Benzotriazole type ultraviolet absorber (Trade name: Tinuvin 900, manufactured by Ciba Specialty Chemicals) | 5 parts by mass |

<Image Recording and Evaluation>

The thus-obtained ink sheet 1 and image-receiving material were superposed so that the dye-providing layer and the image-receiving layer were contacted with each other. For printing, a thermal head was used from the back side of the dye-providing material under the following conditions: Output of the thermal head: 0.25 W/dot; Pulse interval: 0.15 milliseconds to 15 milliseconds; and dot density: 6 dots/mm. Then, the image-receiving layer of the image-receiving material was image-wise colored by a yellow dye. Thereby a brilliant image recording was achieved with no unevenness of transfer printing. Image recordings were repeated in the same manner as the above-described image recording, except that ink sheet 1 was replaced by ink sheets 2 to 11.

Status A reflection densities were measured in the portion indicating a solid density (100% dot density) of each of the obtained images, and evaluated according to the following three grades:
A (very good): reflection density of 1.8 or more
B (good): reflection density of 1.6 or more but less than 1.8
C (probably acceptable): reflection density of 1.0 or more but less than 1.6

Next, each of the thus image-recorded thermal transfer image-receiving material was exposed to Xenon light (17,000 lux) for 7 days to examine light stability (light resistance) of the dye image. Status A reflection densities after exposure were measured in the portions indicating status A reflection density of 1.0. A stability of the image was evaluated in terms of a residual ratio (percentage) based on the reflection destiny before exposure according to the following three grades:
A: 80% or more, but 100% or less
B: 60% or more, but less than 100%
C: less than 60%

The thus-obtained results are shown in Table 2.

Dye for Comparison 1

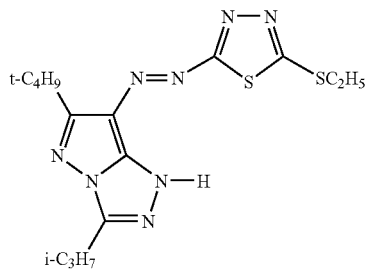

Dye for Comparison 2 (JP-A-2-24191: Exemplified Compound 30)

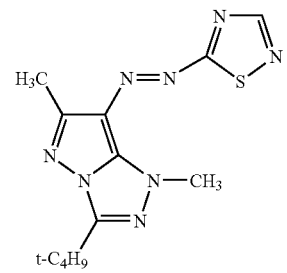

Dye for Comparison 3 (JP-A-2002-67517: Exemplified Compound Y-2)

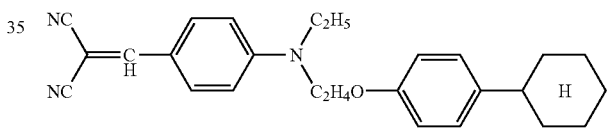

As a result of the above-described image recording tests, it is recognized that the image transferred from the ink sheet containing the azo dye represented by formula (1) to the image-receiving layer has a brilliant hue, and that the image is

TABLE 2

| Ink sheet | Dye | Solubility | Precipitation | Transferring property | Light resistance | Remarks |
|---|---|---|---|---|---|---|
| 1 | (1) | A | A | A | A | This invention |
| 2 | (5) | A | A | A | A | This invention |
| 3 | (7) | A | A | A | A | This invention |
| 4 | (8) | A | A | A | A | This invention |
| 5 | (9) | A | A | A | A | This invention |
| 6 | (10) | A | A | A | A | This invention |
| 7 | (14) | A | A | A | A | This invention |
| 8 | (23) | A | A | A | A | This invention |
| 9 | (28) | A | A | A | A | This invention |
| 10 | Dye for Comparison 1 | B | B | C | B | Comparative Example |
| 11 | Dye for Comparison 2 | B | B | A | A | Comparative Example |
| 12 | Dye for Comparison 3 | A | A | A | C | Comparative Example | excellent in solubility characteristics as compared to the ink sheet containing the comparative dye, and that the dye is capable of sharply reducing a load for dissolution of the dye in the time when the ink sheet is prepared. Further, it is recognized that no deposition of dyes appears with a lapse of time in the ink sheet, so that the ink sheet is excellence in long term storability.

It is also recognized that each of the azo dyes of the present invention improves light stability, as compared to the comparative dye, so that excellent image storability is obtained. It is further recognized that transfer sensitivity is also improved and therefore such the problems that have been believed from the past that it is difficult to solve the compatibility of image storability and transfer sensitivity can be solved at the same time.

Example 4

Application Example 3

Production of Color Toner 3 parts by mass of Dye (1) of the present invention and 100 parts by mass of a toner resin (a styrene/acrylate copolymer; trade name: Himer TB-1000F (manufactured by Sanyo Chemical Industries, Ltd.)) were mixed together and ground by a ball mill, and then the resultant mixture was fusion-mixed together by heating at 150° C., cooled, roughly ground by a hammer mill, and then finely ground by an air-jet-type fine grinder. The obtained fine particles were classified to select particles as fine as 1 to 20 μm for use as a toner. Then, 10 parts by mass of the toner and 900 parts by mass of carrier iron powders (trade name: EFV250/400, manufactured by Nippon Teppun Co., Ltd.) were uniformly mixed together, to prepare a developing agent. Reproduction (copying) was carried out by a dry PPC electrophotographic copier (trade name: NP-5000, manufactured by Canon Inc.) using the developing agent. As a result, it is confirmed that the azo dye had excellent spectral characteristics, and it consequently had excellent properties for use as a toner.

Example 5

Application Example 4

Production of an Inkjet Ink 5.0 g of the azo dye (Exemplified compound (7)) of the present invention, and 7.04 g of sodium dioctylsulfosuccinate were dissolved in 4.22 g of a high-boiling-point organic solvent (S-2) shown below, 5.63 g of a high-boiling-point organic solvent (S-11) shown below and 50 mL of ethyl acetate at 70° C. After that, to the resulting solution, was added 500 mL of deionized water, while stirring by means of a magnetic stirrer, to prepare an oil-in-water-type coarse dispersion. The coarse dispersion thus obtained was passed through a micro-fluidizer (manufactured by MICROFLUI-DEX INC.) five times under a pressure of 60 MPa, to obtain an emulsion having finer particles. Then, the resulting emulsion underwent a solvent-removing treatment by means of a rotary evaporator until the smell of ethyl acetate was lost. In this way, a fine emulsion of a hydrophobic dye was obtained. Then, 140 g of diethylene glycol, 50 g of glycerin, 7 g of SURFYNOL 465 (trade name, manufactured by Air Products & Chemicals Inc.), and 900 mL of deionized water were added to the fine emulsion, to prepare an ink for inkjet.

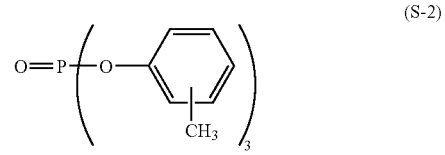

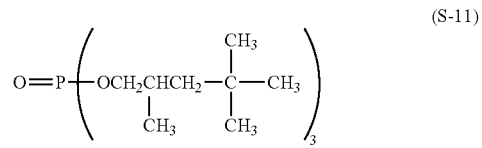

The thus-obtained ink solution was filled in a cartridge of an inkjet printer (PM-G800 (trade name), manufactured by Seiko Epson). Using the printer, an image was recorded on an inkjet paper color photograph finishing Pro (trade name, a product of Fuji Film Corporation). A reflection spectrum of the thus-obtained image is shown in FIG. 1. As is apparent from the result of FIG. 1, it is recognized that the obtained image has excellent spectral characteristics color and excellent light fastness, thereby providing excellent properties as an inkjet ink.

Example 6

Application Example 5

Production of Color Filter

<Preparation of Positive Resist Composition>
3.4 parts by mass of a cresol novolak resin (mass average molecular weight of 4,300 in terms of polystyrene) obtained from a mixture of m-cresol/p-cresol/formaldehyde (reaction molar ratio=5/5/7.5), 1.8 parts by mass of o-naphthoquino-nediazido-5-sulfonic acid ester (two hydroxyl groups were esterified on average) prepared using a phenol compound represented by the formula below, 0.8 part by mass of hexamethoxymethylolmelamine, 20 parts by mass of ethyl lactate, and 1 part by mass of the dye of the present invention were mixed together, to obtain the positive resist composition.

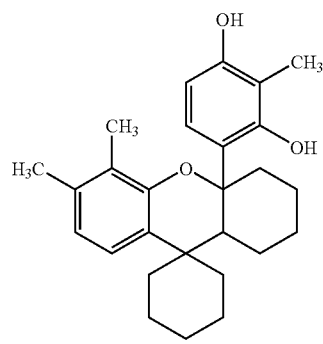

Figure 2:
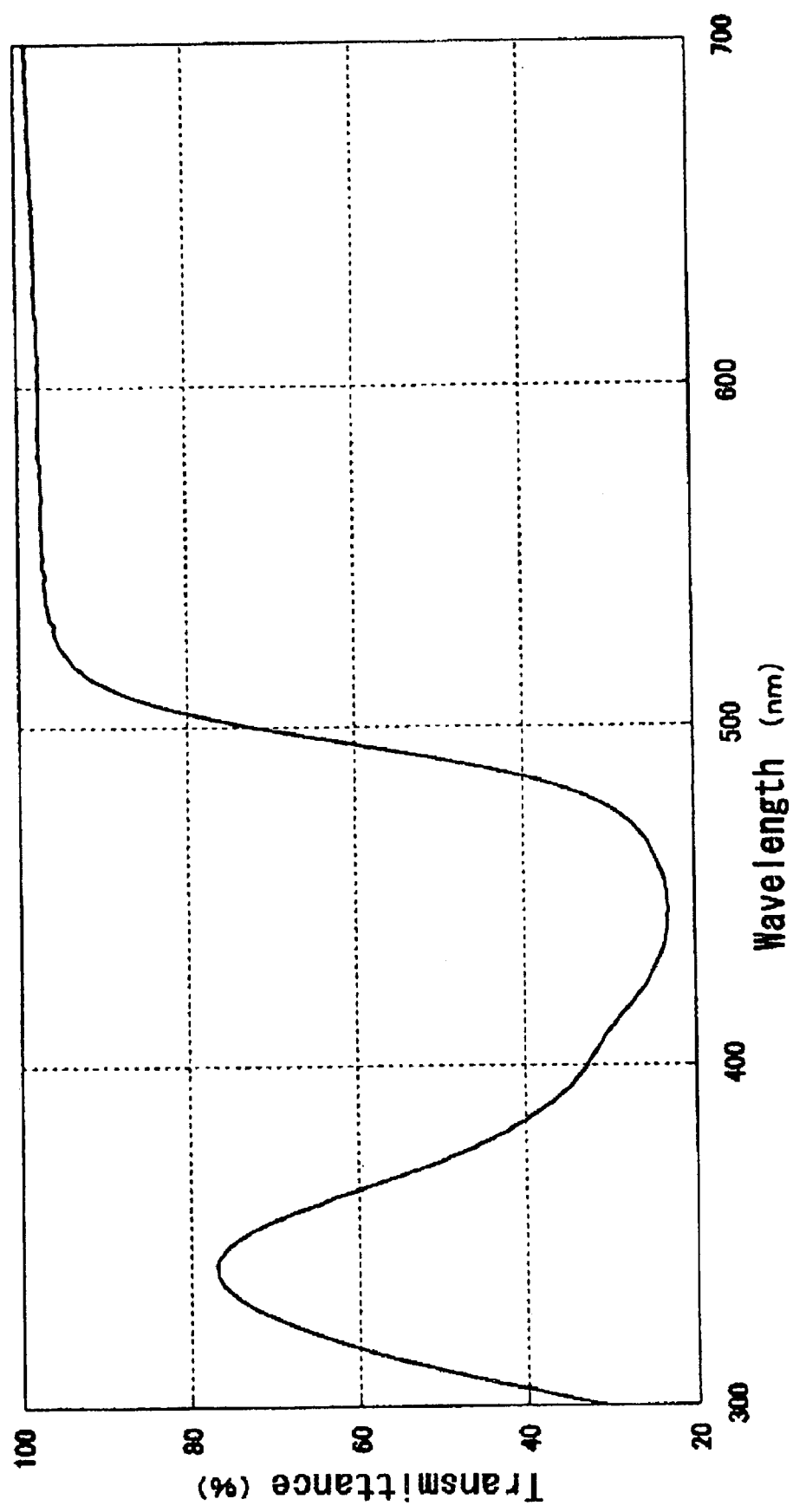
FIG. 2 shows a transmission spectrum of the color filter prepared in a working example.

<Preparation of Color Filter>
The obtained positive-working resist composition was coated on a silicon wafer by means of spin coat, followed by evaporation of a solvent. Subsequently, the silicon wafer was exposed to light through a mask, thereby to decompose a quinonediazide compound. Thereafter, the exposed portion was eliminated by heating at 100° C. and subsequently alkali development, thereby to obtain a positive-working colored pattern having a resolution of 0.8 μm. After subjecting it to a whole-surface exposure and then heating at 150° C. for 15 minutes, was obtained a yellow complementary color type color filter. Exposure was carried out using an i-line exposure stepper HITACHI LD-5010-i (trade name, manufactured by Hitachi Corporation, NA=0.40). As a developing solution, was used SOPD or SOPD-B (each trade name, manufactured by Sumitomo Chemical). A transmission spectrum of the thus-obtained color filter is shown in FIG. 2. As is apparent from the result of FIG. 2, it is confirmed that the obtained color filter had excellent spectral characteristics and light transmission, thereby providing excellent properties as a color filter.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2006-182440 filed in Japan on Jun. 30, 2006, which is entirely herein incorporated by reference.

We claim:

1. An azo dye represented by formula (1):

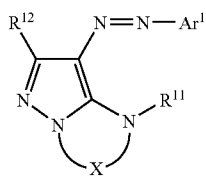

Formula (1)

wherein $R^{11}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfonyl group, an alkyl- or aryl-sulfonyl group, an acyl group, an aryloxycarbonyl group, an alkoxycarbony group, a carbamoyl group, an aryl- or heterocyclic-azo group or an imido group, $R^{12}$ represents a hydrogen atom or a monovalent substituent, $Ar^1$ represents a group selected from members (1) of heterocyclic groups set forth below, and X represents atoms necessary to form a ring an atomic group selected from —C($R^{13}$)=N—, —N=C($R^{13}$)—, or —C(=O)—N($R^{13}$)—C(=O)— in which $R^{13}$ represents a hydrogen atom or a substituent group;

Members (1) of Heterocyclic Groups

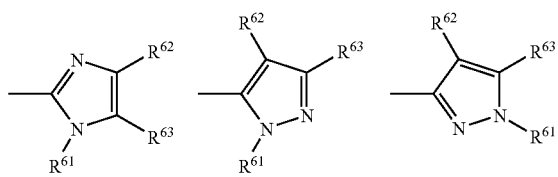

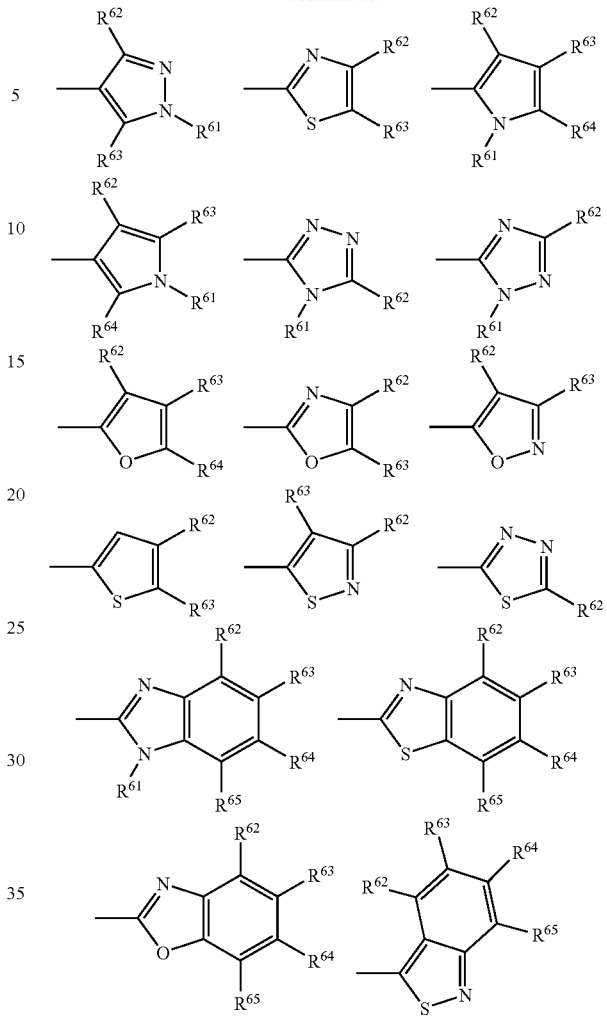

wherein, in members (1) of heterocyclic groups, $R^{61}$, $R^{62}$, $R^{63}$, $R^{64}$ and $R^{65}$ each independently represents a hydrogen atom or a substituent.

2. The azo dye according to claim 1, wherein $Ar^1$ in the formula (1) represents a group selected from members (2) of heterocyclic groups:

Members (2) of Heterocyclic Groups

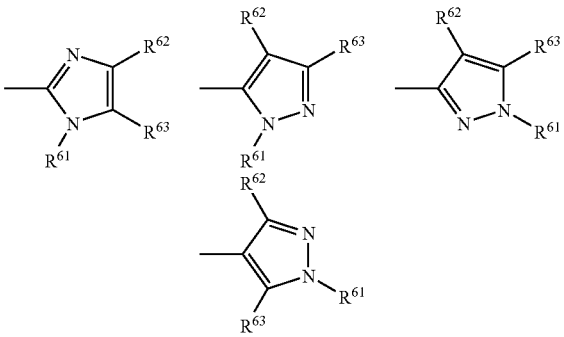

wherein $R^{61}$, $R^{62}$ and $R^{63}$ each independently represents a hydrogen atom or a substituent.

3. The azo dye according to claim 1, wherein X in the formula (1) represents —C($R^{14}$)=N—, or —N=C($R^{14}$)—, $R^{14}$ represents a hydrogen atom or a substituent.

4. The azo dye according to claim 1, wherein the azo dye represented by formula (1) is an azo dye represented by formula (2) or (3):

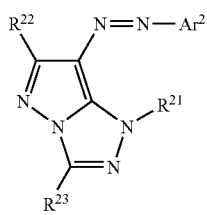

Formula (2)

wherein, in formula (2), $R^{21}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbony group, a carbamoyl group, an aryl- or heterocyclic-azo group or an imido group, $R^{22}$ and $R^{23}$ each independently represents a hydrogen atom or a monovalent substituent, $Ar^2$ represents a group selected from the members (1) of heterocyclic groups;

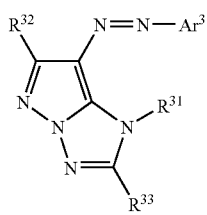

Formula (3)

wherein, in formula (3), $R^{31}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbony group, a carbamoyl group, an aryl- or heterocyclic-azo group or an imido group, $R^{32}$ and $R^{33}$ represents a hydrogen atom or a monovalent substituent, $Ar^3$ represents a group selected from the members (1) of heterocyclic groups.

5. The azo dye according to claim 4, wherein $Ar^2$ and $Ar^3$ in the formula (2) or (3) each independently represents a group selected from members (2) of heterocyclic groups:

Members (2) of Heterocyclic Groups

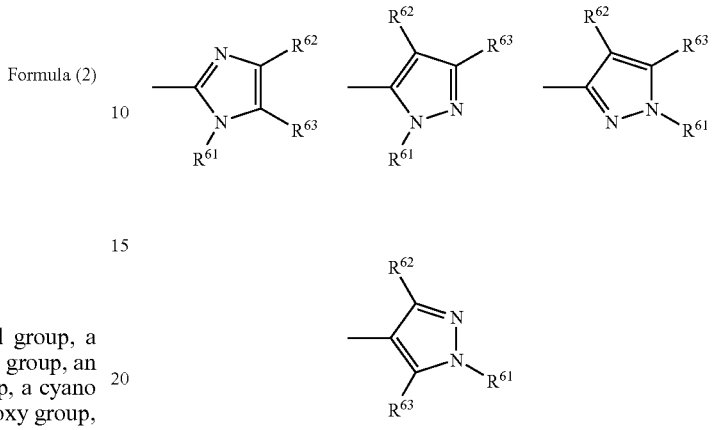

wherein, in members (2) of heterocyclic groups, $R^{61}$, $R^{62}$ and $R^{63}$ each independently represents a hydrogen atom or a substituent.

6. The azo dye according to claim 1, wherein the azo dye is an azo dye represented by formula (4) or (5):

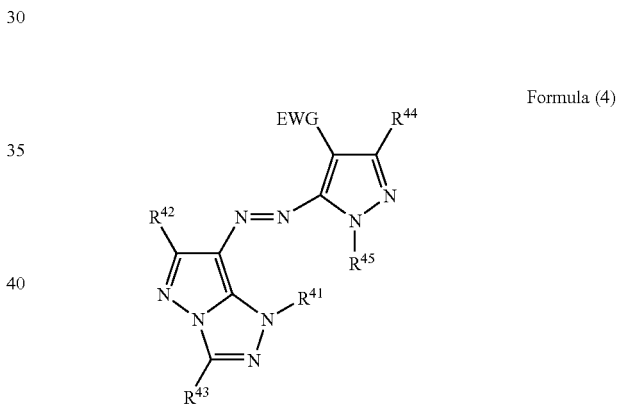

Formula (4)

wherein, in formula (4), $R^{41}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbony group, a carbamoyl group, an aryl- or heterocyclic-azo group or an imido group and $R^{45}$ represents a monovalent substituent, $R^{42}$, $R^{43}$ and $R^{44}$ each independently represents a hydrogen atom or a monovalent substituent, EWG represents an electron-withdrawing group having a Hammett's substituent constant $\sigma_p$ value of 0.2 to 1.0;

Formula (5)

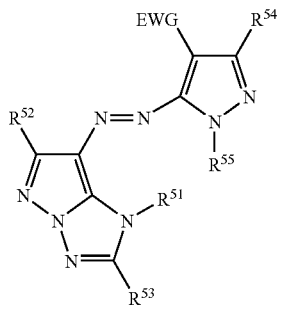

wherein, in formula (5), $R^{51}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbony group, a carbamoyl group, an aryl- or heterocyclic-azo group or an imido group and $R^{55}$ represents a monovalent substituent, $R^{52}$, $R^{53}$ and $R^{54}$ each independently represents a hydrogen atom or a monovalent substituent, EWG represents an electron-withdrawing group having a Hammett's substituent constant $\sigma_p$ value of 0.2 to 1.0.

7. The azo dye according to claim 6, wherein the EWG in the formula (4) or (5) represents a carbamoyl group or a cyano group.

8. The azo dye according to claim 1, wherein $R^{11}$ represents an alkyl group, an alkenyl group, an aryl group, a heterocyclic group, or an acyl group.

9. A colored composition comprising the azo dye according to claim 1.

10. A heat-sensitive transfer recording ink sheet comprising the azo dye according to claim 1.

11. The heat-sensitive transfer recording ink sheet according to claim 10 that comprises a dye-providing layer, wherein a content of the azo dye in the dye-providing layer is in the range of from 0.03 to 1.0 g/m².

12. The heat-sensitive transfer recording ink sheet according to claim 10 that comprises a thermally diffusible cyan dye which can form a cyan image, a thermally diffusible magenta dye which can form a magenta image, and a thermally diffusible yellow dye which can form a yellow image be formed.

13. A heat-sensitive transfer recording method that comprises forming an image on an image-receiving material having a support and an ink receptive layer containing a polymer on the support, using the heat-sensitive transfer recording ink sheet according to claim 10.

14. A color toner comprising the azo dye according to claim 1.

15. The color toner according to claim 14 that comprises a carrier, wherein average particle diameter of the carrier is 30 to 150 μm in terms of volume average particle diameter.

16. An ink for inkjet comprising the azo dye according to claim 1.

17. The ink according to claim 16 that a pH is 6 to 10.

18. A color filter comprising the azo dye according to claim 1.

19. The color filter according to claim 18 that is a color filter of RGB primary colors or Y.M.C. complementary colors.

20. An azo dye represented by formula (2) or (3):

Formula (2)

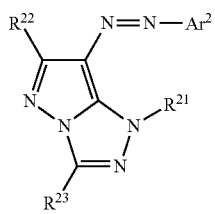

wherein, in formula (2), $R^{21}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbony group, a carbamoyl group, an aryl- or heterocyclic-azo group or an imido group, $R^{22}$ and $R^{23}$ each independently represents a hydrogen atom or a monovalent substituent, $Ar^2$ represents a group selected from members (1)' of heterocyclic groups set forth below;

Formula (3)

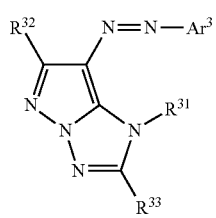

wherein, in formula (3), $R^{31}$ represents an alkyl group, a cycloalkyl group, an alkenyl group, a cycloalkenyl group, an alkynyl group, an aryl group, a heterocyclic group, a cyano group, an alkoxy group, an aryloxy group, an acyloxy group, a carbamoyloxy group, an alkoxycarbonyloxy group, an aryloxycarbonyloxy group, an amino group including an alkylamino group, an anilino group and a heterocyclic amino group; an acylamino group, an aminocarbonylamino group, an alkoxycarbonylamino group, an aryloxycarbonylamino group, a sulfamoylamino group, an alkyl- or aryl-sulfonylamino group, an alkylthio group, a sulfamoyl group, an alkyl- or aryl-sulfinyl group, an alkyl- or aryl-sulfonyl group, an acyl group, an aryloxycarbonyl group, an alkoxycarbony group, a carbamoyl group, an aryl- or heterocyclic-azo group or an imido group, $R^{32}$ and $R^{33}$ each independently represents a hydrogen atom or a monovalent substituent, $Ar^3$ represents a group selected from members (1)' of heterocyclic groups set forth below;

Members (1)' of Heterocyclic Groups
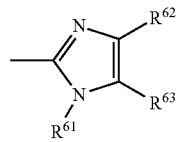
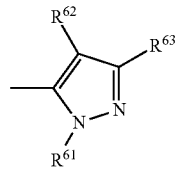
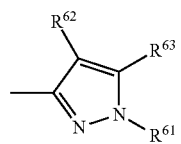
-continued
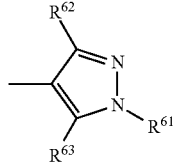
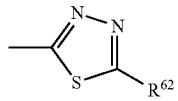
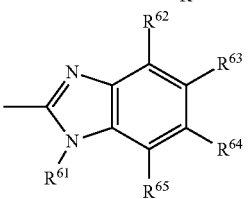
wherein, in members (1)' of heterocyclic groups, $R^{61}$, $R^{62}$, $R^{63}$, $R^{64}$ and $R^{65}$ each independently represents a hydrogen atom or a substituent.
* * * * *